(12) United States Patent
Khansari et al.

(10) Patent No.: US 10,956,636 B2
(45) Date of Patent: Mar. 23, 2021

(54) METHOD FOR OPTIMIZING THE CONSTRUCTION OF A CAR BODY

(71) Applicant: Ningbo Geely Automobile Research & Development Co., Ltd., Ningbo (CN)

(72) Inventors: Reza Khansari, Gothenburg (SE); Yassine Wardi, Gothenburg (SE); Markus Fritzell, Floda (SE); Viktor Jönsson, Hisings Backa (SE); Jens Weber, Mölndal (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 17/011,070

(22) Filed: Sep. 3, 2020

(65) Prior Publication Data

US 2020/0401746 A1 Dec. 24, 2020

Related U.S. Application Data

(63) Continuation of application No. PCT/CN2019/076170, filed on Feb. 26, 2019.

(30) Foreign Application Priority Data

Mar. 9, 2018 (EP) .................................... 18161045

(51) Int. Cl.
*G06F 30/15* (2020.01)
*G06F 30/23* (2020.01)
(Continued)

(52) U.S. Cl.
CPC ............. *G06F 30/23* (2020.01); *G06F 30/15* (2020.01); *G06F 30/20* (2020.01); *G06F 2111/10* (2020.01); *G06T 17/20* (2013.01)

(58) Field of Classification Search
None
See application file for complete search history.

(56) References Cited

U.S. PATENT DOCUMENTS

| | | | |
|---|---|---|---|
| 6,195,625 B1 * | 2/2001 | Day | G06F 30/15 703/7 |
| 2003/0016832 A1 * | 1/2003 | Naganarayana | G06F 30/15 381/71.4 |

(Continued)

FOREIGN PATENT DOCUMENTS

| | | |
|---|---|---|
| CN | 107256289 A | 10/2017 |
| DE | 102012000814 A1 | 7/2013 |
| DE | 102013218202 A1 | 4/2014 |

OTHER PUBLICATIONS

International Search Report and Written Opinion from corresponding International Application No. PCT/CN2019/076170, dated May 23, 2019, 10 pages.

(Continued)

*Primary Examiner* — Kibrom K Gebresilassie
(74) *Attorney, Agent, or Firm* — Tucker Ellis LLP

(57) ABSTRACT

A method for optimizing construction of a car body includes selecting body element(s) and obtaining first deformation values therefor from a fully-trimmed model of a first car body construction based on measured dynamic values or simulated dynamic data in a dynamic load simulation during a time period; determining force(s) to be applied to a reduced model of the first car body construction in an equivalent static load simulation model to achieve second deformation values of the element(s) for the reduced model, the second values correspond to the first values for the same element(s); applying in the equivalent static load simulation model, the determined force(s) to a reduced model of an alternative car body construction to achieve third deformation values of the element(s) for the reduced model of the (Continued)

second car body construction; determining if the third values are within a predetermined deformation range for the second car body construction.

18 Claims, 13 Drawing Sheets

(51) Int. Cl.
 *G06F 30/20* (2020.01)
 *G06F 111/10* (2020.01)
 *G06T 17/20* (2006.01)

(56) References Cited

U.S. PATENT DOCUMENTS

| | | | | |
|---|---|---|---|---|
| 2005/0004779 A1* | 1/2005 | Ueda | ............... | G06F 30/23 702/182 |
| 2006/0010427 A1* | 1/2006 | Hoffman | ............... | G06F 30/00 717/124 |
| 2006/0259283 A1* | 11/2006 | Brughmans | ............... | G06F 30/15 703/2 |
| 2008/0056506 A1* | 3/2008 | Naganarayana | ............... | G06F 30/15 381/71.4 |
| 2011/0093240 A1* | 4/2011 | Hallquist | ............... | G06F 30/23 703/1 |
| 2012/0136639 A1 | 5/2012 | Narayana | | |
| 2013/0185030 A1* | 7/2013 | Hallquist | ............... | G06F 30/23 703/2 |
| 2014/0343902 A1* | 11/2014 | Hallquist | ............... | G06T 17/20 703/2 |
| 2015/0234958 A1* | 8/2015 | Juskiewicz | ............... | G06F 30/23 700/98 |
| 2018/0285499 A1* | 10/2018 | Wilcox | ............... | G06F 30/15 |
| 2020/0202052 A1* | 6/2020 | Cunha | ............... | G06F 30/17 |
| 2020/0279026 A1* | 9/2020 | Donabedian | ............... | G06F 30/15 |

OTHER PUBLICATIONS

A. Maressa, A. et al., "A wave-based substructuring approach for concept modeling of vehicle joints", Computers and Structures 89 (2011) 2369-2376, Jul. 22, 2011, 8 pagesq.

* cited by examiner

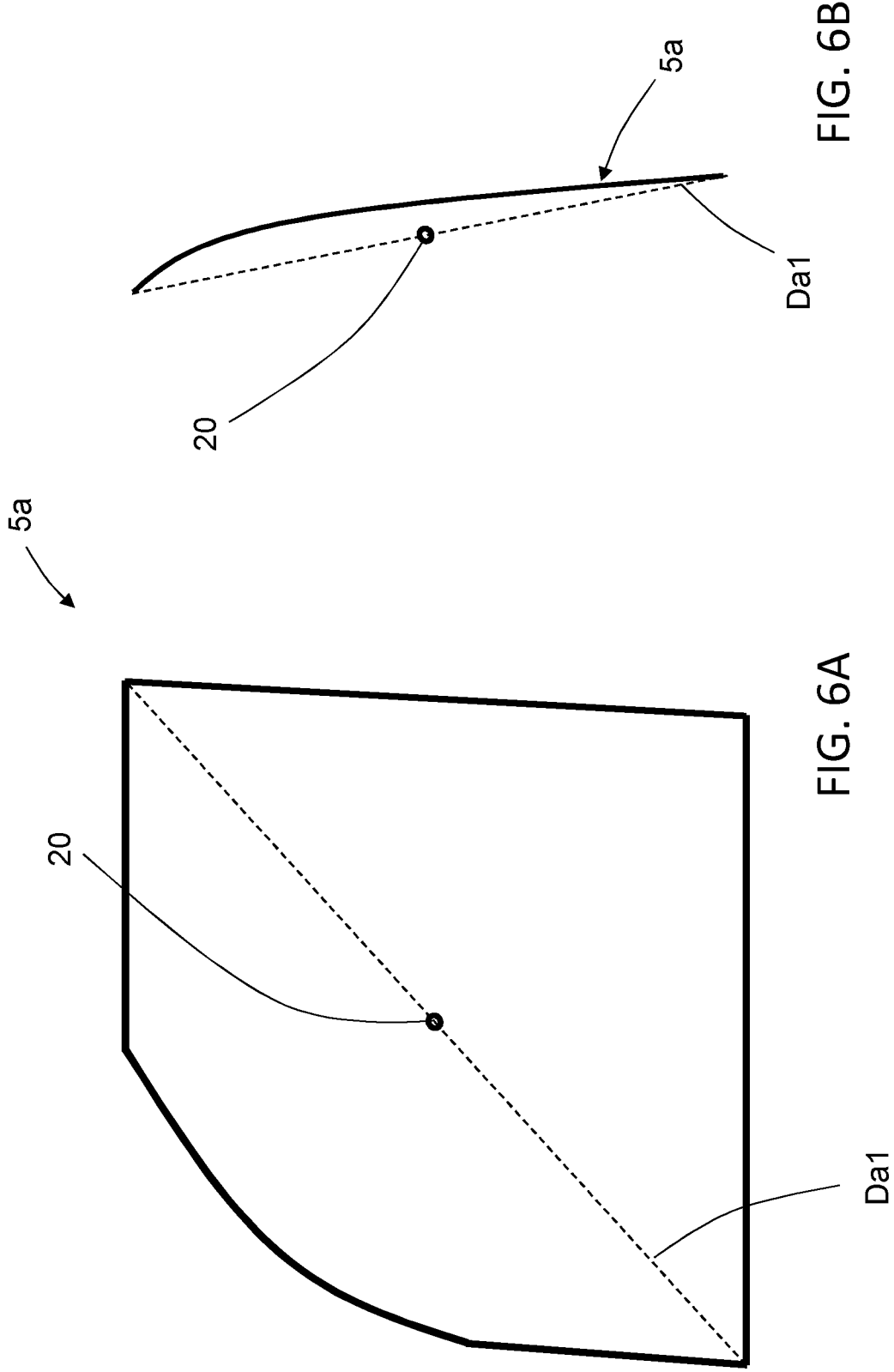

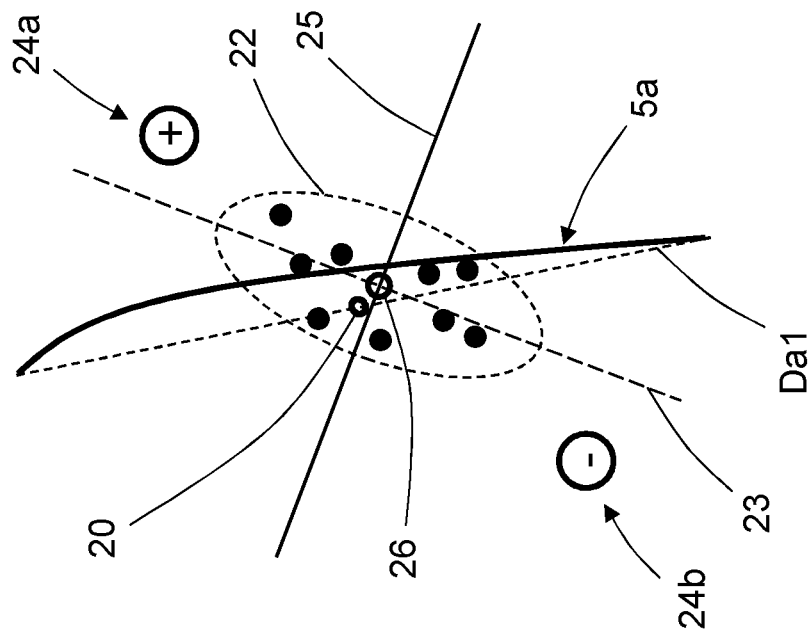
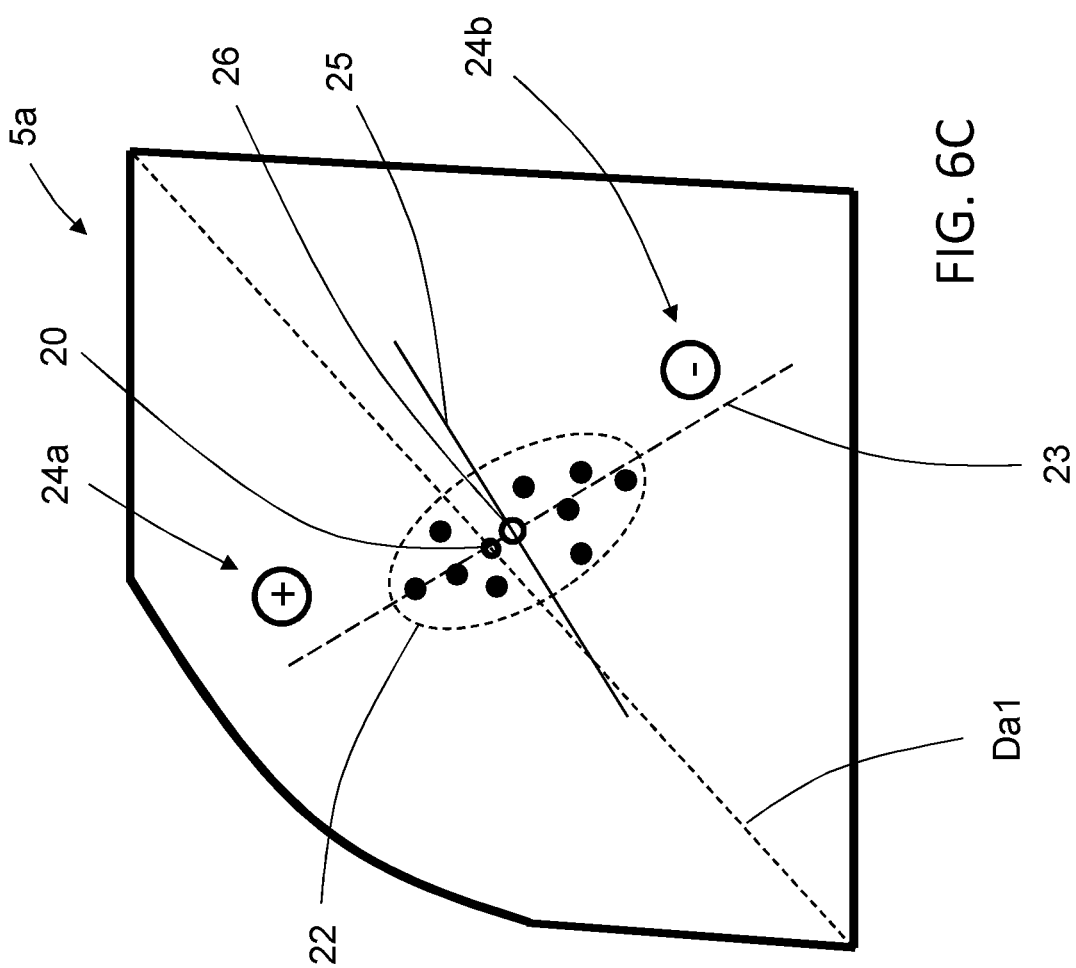

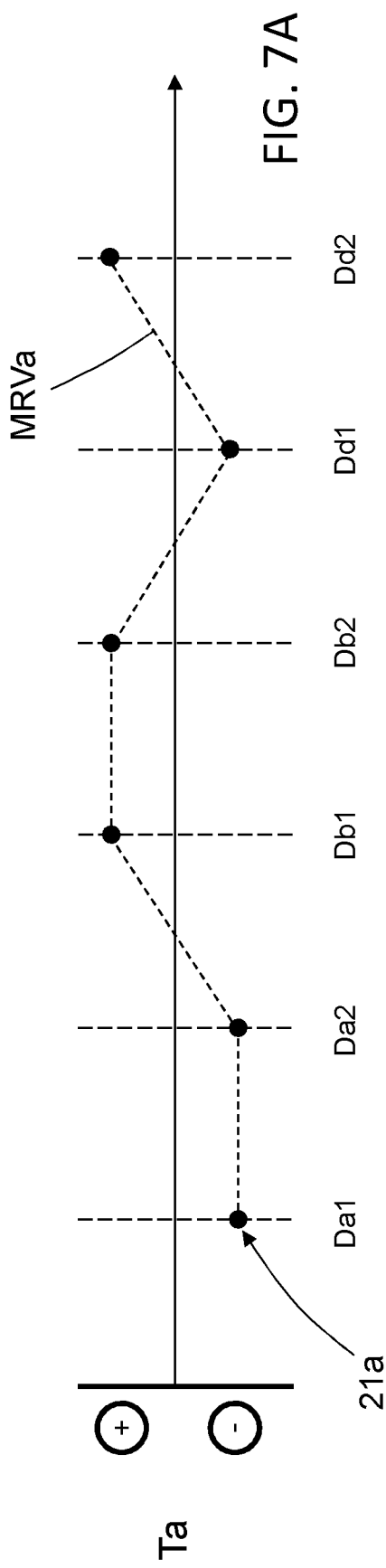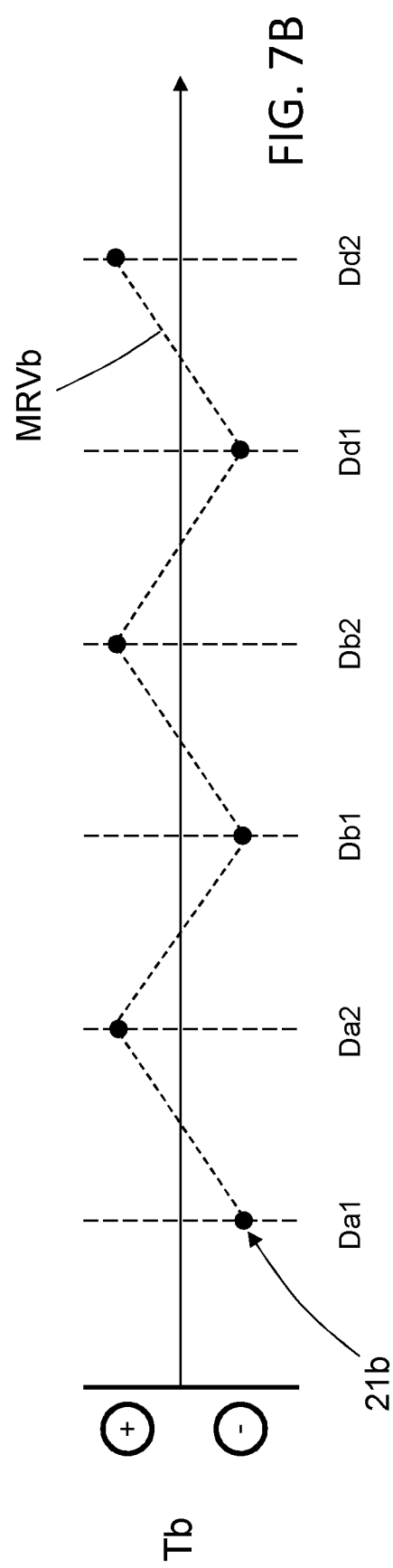

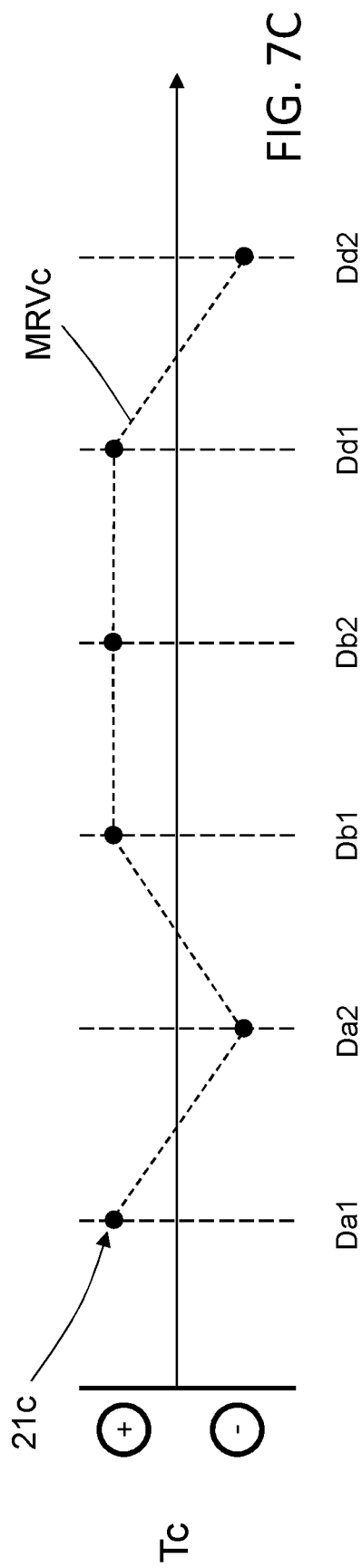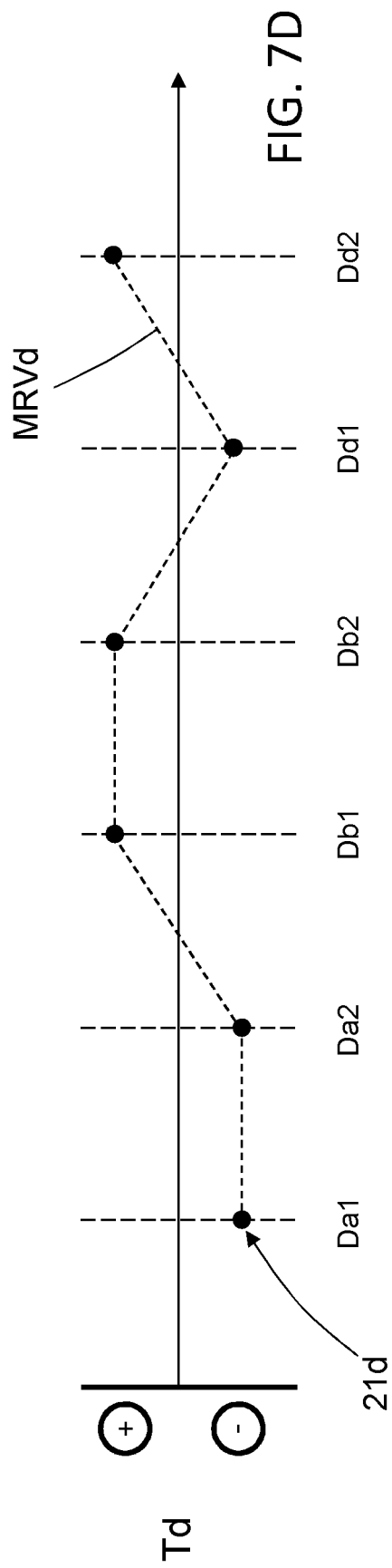

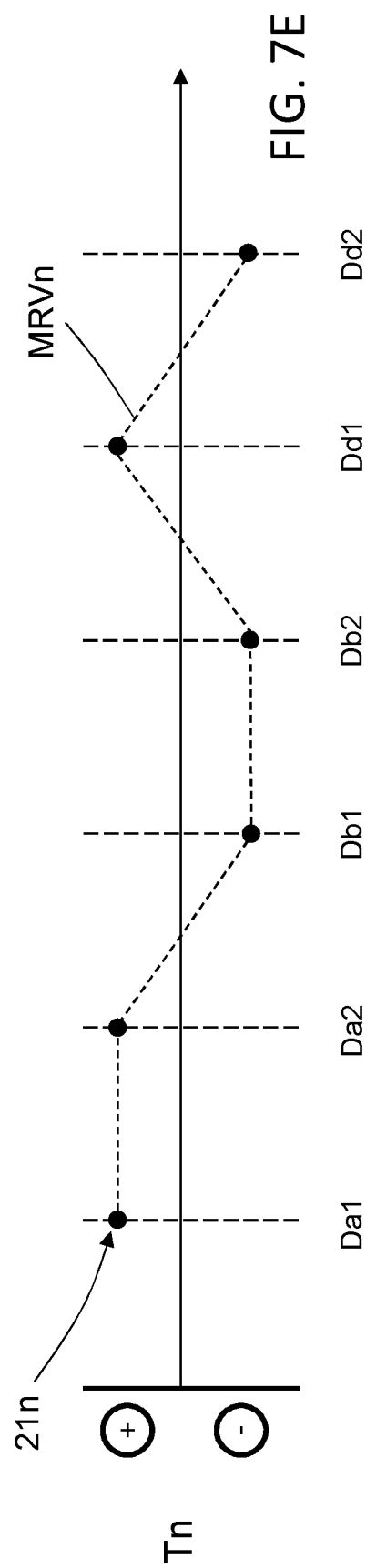

METHOD FOR OPTIMIZING THE CONSTRUCTION OF A CAR BODY

RELATED APPLICATION DATA

This application is a continuation of International Patent Application No. PCT/CN2019/076170, filed Feb. 26, 2019, which claims the benefit of European Patent Application No. 18161045.2, filed Mar. 9, 2018, the disclosures of which are incorporated herein by reference in their entireties.

TECHNICAL FIELD

The present disclosure relates to a method for optimizing the construction of a car body through determining deformations of one or more selected car body elements of the car body, and where deformation values of the selected car body elements are calculated.

BACKGROUND

In modern vehicle construction and design processes, a car body or parts of a car body are simulated in mathematical or computerized models to better understand the structural behaviour of the car construction. There are many different computer simulation models available that can be used in different stages of the car design process. Real test vehicles may also be used, and many times both real life vehicle testing procedures and vehicle model computer simulations are used in the construction process. Computerized models of vehicles are commonly used to substitute real vehicle models in the optimization processes needed when developing new vehicles. The computerized models are reducing costs and development time.

Important aspects in the design process are the deformations of different parts of the car body construction, where the car body stiffness has a major impact on the squeak & rattle performance of a car. A stiff car body construction can reduce the excitation level of different interior assemblies used in the car construction, such as for example interior structures like the door panels, the car body panels and the cockpit. Also the reduced motions at the seals in closure gaps of the car body can through a stiff car body construction improve the noise, vibration, and harshness (NVH) performance of the car and reduce the risk for squeak & rattle throughout the car. Therefore, a requirement that is limiting the deformation of the car body would be desirable. However, a too stiff car body construction could have a negative impact on the crashworthiness of the car. The deformation of the car body construction that is needed to absorb energy in a crash situation may be limited in a construction with a high stiffness. There is thus a need in the design of a car construction to optimize the construction based on different parameters, such as the stiffness of different parts of the car body.

One common way to determine the stiffness of the car body construction is to use a static torsional stiffness calculation model or to simulate the first torsional mode of a non-trimmed car body only, and through these models the stiffness of a complex body structure is in each case reflected by a single value only. The local stiffness in the different areas of the car, like for example the front part, the rear part, the lower part of the body and the upper part of the body are not specifically considered which makes the use of a static or dynamic torsional stiffness calculation model unreliable.

There is thus a need for an improved way of optimizing the construction of a car body through computer simulations in computer models, where the structural behaviour of the car is reproduced through mathematical modelling of the car structure.

SUMMARY

An object of the present disclosure is to provide a method for optimizing the construction of a car body where the previously mentioned problems are avoided. This object is at least partly achieved by the features of the independent claims. The dependent claims contain further developments of the method for optimizing the construction of the car body.

The disclosure concerns a method for optimizing the construction of a car body through determining deformations of one or more selected car body elements of the car body, where the one or more car body elements of the car body for which the deformations should be determined are selected. A first set of deformation values of the selected car body elements are obtained from a fully trimmed model of a first car body construction, wherein the first set of deformation values are based on measured dynamic values or simulated dynamic data in a complete dynamic load simulation model during a specified time period. One or more forces that need to be applied in a reduced model of the first car body construction in an equivalent static load simulation model are determined in order to achieve a second set of deformation values of the selected car body elements for the reduced model of the first car body construction, so that the second set of deformation values of the selected car body elements are corresponding to the first set of deformation values for the same selected car body elements. In the equivalent static load simulation model, the one or more determined forces are applied to a reduced model of a similar alternative second car body construction to achieve a third set of deformation values of the selected car body elements for the reduced model of the second car body construction. It is determined if the third set of deformation values are within a predetermined desired deformation value range for meeting deformation demands of the second car body construction.

Advantages with these features are that the design of the car construction can be optimized in a simple and reliable way. Through the specific use of the different car body constructions and the simulation models it is possible at an early stage of the design process to optimize the car body construction for a reduced model of the similar alternative second car body construction. The structural behaviour of the car construction can in this way be reproduced through the mathematical modelling of the reduced model of the car body structure in the equivalent static load simulation model. The construction and design process can be made more efficient and important structural features as the stiffness and the deformations of different parts of the car body can be chosen to improve for example the squeak & rattle performance of the car with a stiff enough car body construction, without compromising the crashworthiness of the car.

According to an aspect of the disclosure, the first set of deformation values of the selected car body elements from the fully trimmed model of the first car body construction, are obtained from simulations in the complete dynamic load simulation model, or from sensors arranged on the fully trimmed model. Measured values are providing an alternative way to establish the first set of deformation values.

According to an aspect of the disclosure, if the third set of deformation values are not within the predetermined desired deformation value range, one or more constructional parameters of the reduced model of the second car body construction are changed to achieve one or more modified second car body constructions in the reduced model, and the equivalent static load optimization simulation step for the modified second car body constructions in the reduced model is repeated until a new third set of deformation values are achieved within the predetermined desired deformation value range. In this way, the car body construction can be optimized through an iterative process, where different design and constructional parameters could be changed.

According to another aspect of the disclosure, the method further comprises the step: verifying, through simulating a fully trimmed model of the second car body construction or a fully trimmed model of the modified second car body constructions in the complete dynamic load simulation model during a specified time period, that the third set of deformation values of the selected car body elements of the fully trimmed model of the second car body construction or the fully trimmed model of the modified second car body constructions are within a predetermined deformation value range for the same car body elements. This step gives a possibility to further verify the simulations and the optimization process of the car body construction. Once the fully trimmed model of the second car body construction or the fully trimmed model of the modified second car body construction is available, the method is possible to verify.

According to a further aspect of the disclosure, the deformation values of the selected car body elements are calculated as an absolute change in deformation or a relative change in deformation of a distance between two selected measuring points on the selected car body elements. In this way, the distance between the selected measuring points can be measured both without deformation and during deformation. The absolute or relative changes in deformations give an indication on how large the deformation is for the distance between the selected measuring points.

According to other aspects of the disclosure, the first set of deformation values are established through a filtered deformation value calculation for each selected car body element, where the filtered deformation values for the selected car body elements are established through collecting the simulated first set of deformation values of each selected car body element during the specified time period, and where the filtered deformation values for each selected car body element are calculated as the mean value of a percentage of the simulated highest deformation values during the specified time period. The filtered deformation value calculation is used for reducing a high number of deformation values measured and collected during a specific time period into a single set of deformation values from the dynamic simulation step that can be compared with the sets of deformation values in the static simulations.

According to an aspect of the disclosure, the possibility of calculating an equivalent static load in the equivalent static load simulation model is assessed through calculating a Max Principal Response Vector and a Vector Participation from the first set of deformation values. Through the calculation of the Max Principal Response Vector and the Vector Participation from the deformation values forming the first set of deformation values, the possible use of the equivalent static load simulation model is evaluated in an efficient and reliable way.

According to other aspects of the disclosure, the one or more selected car body elements are one or more car body closure openings, and the one or more car body closure openings are one or more of a front door closure opening, a rear door closure opening, a roof closure opening, and a rear closure opening. The set of deformation values are determined through calculations of deformations of diagonals of each of the selected car body closure openings. The car body closure openings are suitable for the determination of deformations of the car body in order to improve the NVH performance, including the squeak & rattle performance, of the car and to achieve a stiff enough car body construction without compromising the crashworthiness of the car.

According to other aspects of the disclosure, the one or more selected car body elements are one or more cross sections. The set of deformation values are determined through calculations of deformations of diagonals of each of the selected cross sections. Also the cross sections are suitable for the determination of deformations of the car body in order to improve the NVH performance, including the squeak & rattle performance, of the car and to achieve a stiff enough car body construction without compromising the crashworthiness of the car.

According to a further aspect of the disclosure, the reduced model of the car body constructions is a body-in-grey car body.

According to an aspect of the disclosure, the one or more forces that need to be applied in the reduced model of the second car body constructions in the equivalent static load simulation model are applied to one or more strut mounting points of the reduced model of the second car body construction. The car has four different strut mounting points taking up both dynamic and static load during a driving cycle, and the strut mounting points are therefore suitable for the application of forces in the equivalent static load simulation model.

The disclosure further concerns a non-transitory computer-readable medium comprising instructions which, when executed by a computer, cause the computer to carry out the method, and a cloud computing system configured to carry out the method.

BRIEF DESCRIPTION OF DRAWINGS

The disclosure will be described in greater detail in the following, with reference to the attached drawings, in which FIGS. 6A-6E show schematically in side views and front views, a car body closure opening with a diagonal mid-point, and a point cloud having a point cloud mid-point, a main direction, and a plane normal to the main direction according to the disclosure, and FIGS. 7a-7E show schematically, examples of Max Principle Response Vectors according to the disclosure.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1A:
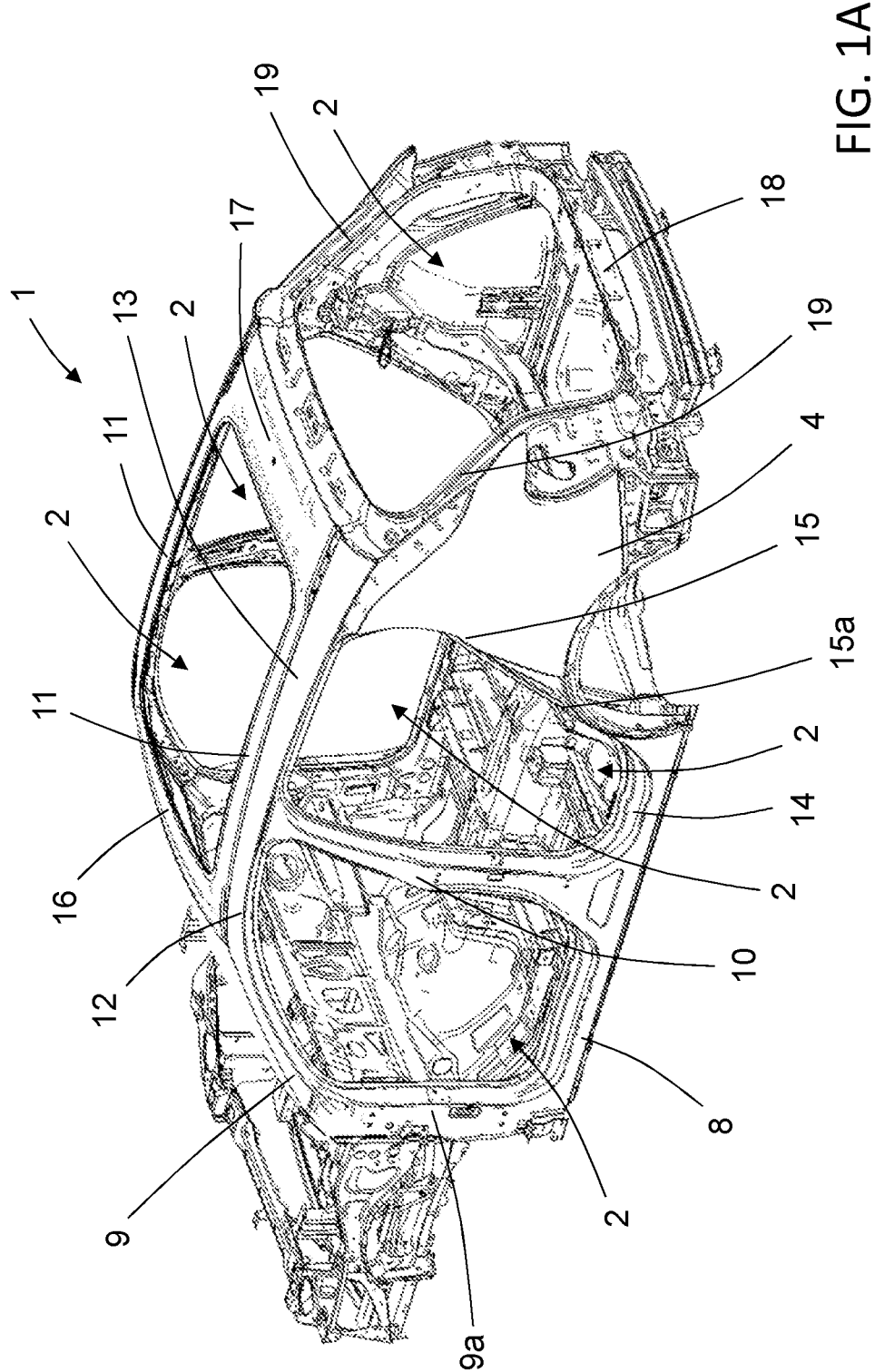
FIGS. 1A-1B show schematically, in perspective views a reduced model of a car body construction according to the disclosure.
Figure 1B:
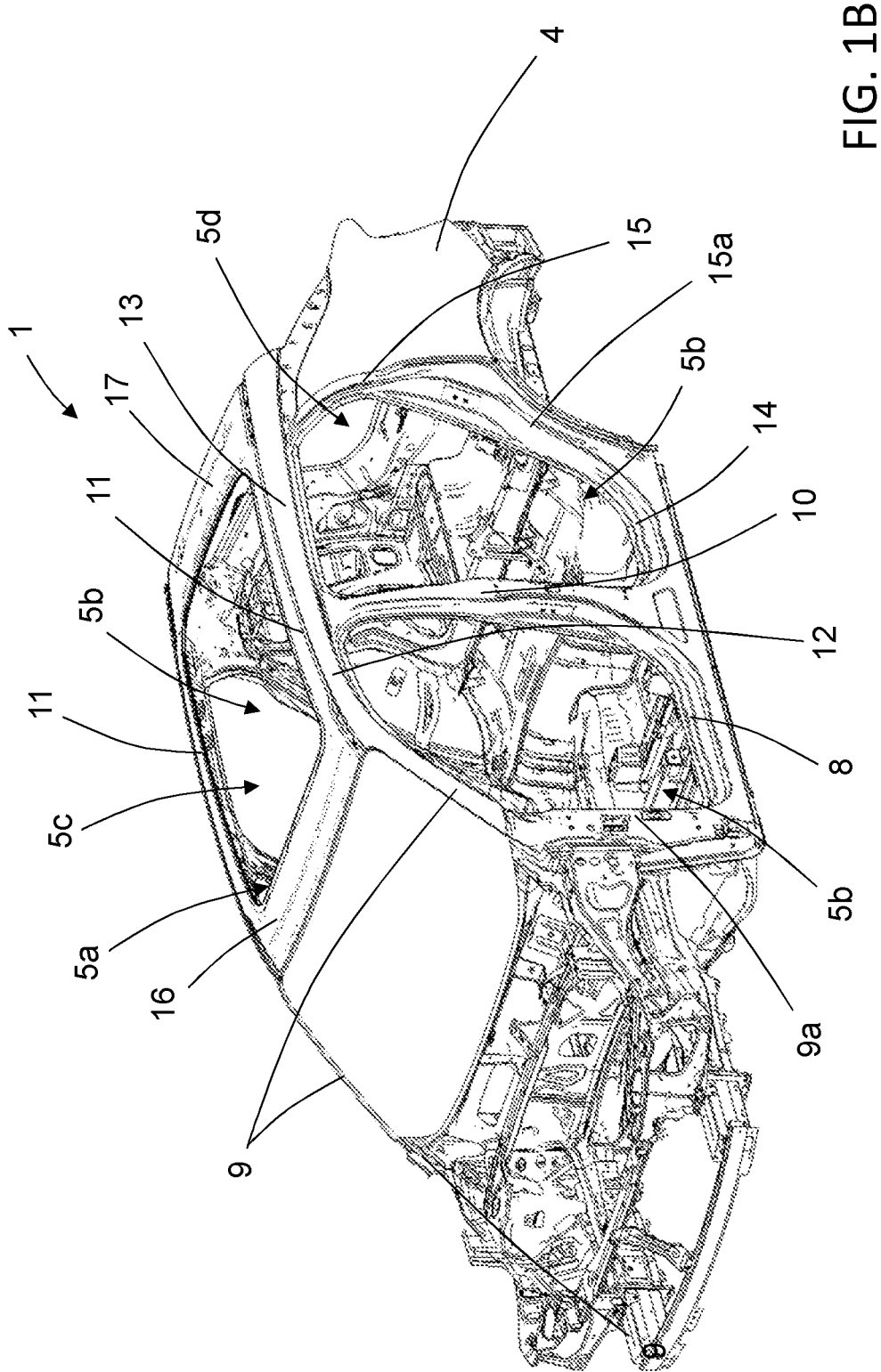

FIGS. 1A-1B schematically show an example embodiment of a vehicle or car body construction 1. A vehicle or car could be designed in many different ways and in the construction and design process of a car it is often desired to optimize the constructional features of the car body construction 1. There are often many different aspects that need to be considered throughout the construction and design process and important structural features are the stiffness and the deformations of different parts of the car body. When a car is driven in different driving conditions, the forces acting on the car will deform the car body construction and therefore the car body construction needs to be optimized with respect to the stiffness and deformations of the car body. The stiffness and also the deformations of the car body are impacting for example the NVH performance, including the squeak & rattle performance, of the car and the stiffer the car body construction is, the more the excitation levels of different interior assemblies used in the car construction are reduced. Examples of interior assemblies are structures, such as the door panels, the car body panels and the cockpit. Further, the reduced motion of the car body at the seals in closure gaps of the car body construction 1 can through a stiff car body construction 1 reduce the risk for squeak and rattle throughout the car. A high stiffness of the car body construction 1 may however have a negative impact on the crashworthiness of the car, since the deformation of the car body construction 1 that is needed to absorb energy in a crash situation may be limited in a construction with a too high stiffness.

In order to balance the stiffness of different parts or car body elements 2 of the car body construction to achieve an optimal design of the car body, the car body construction 1 needs to be optimized in different ways. As an example, the thickness of the materials used in the car body could for example be varied in order to achieve a desired result. Also the different materials used in different parts of the car body construction may be changed or modified to find an optimal car body structure.

It should be noted that the expression car in this context is used as a general description of a vehicle construction, and the disclosure is also including other vehicle constructions even if referred to a car, a car body or a car body construction for simplifying the understanding of the disclosure. Other examples of vehicle constructions that are included are other car-like vehicles, trucks, and buses.

In modern car construction and design processes within the automotive industry, a car body or parts of a car body are simulated in computerized or mathematical models to better understand the structural behaviour of the car construction. Further, real car body constructions may also be used in testing processes when developing new car models, where for example sensors are used to measure different aspects of the car body construction. The simulation of the car body construction 1 in computer simulation models could be made at different stages during the construction process of a car model. When a complete car model has been designed, a fully trimmed model 3 of the car body construction could be simulated, and in early stages of the design process a reduced model 4 of the car body construction is often available. Depending on the optimization processes, the car body construction 1 may be a computer simulated car body construction, a real car body construction or a combination thereof.

Figure 4A:
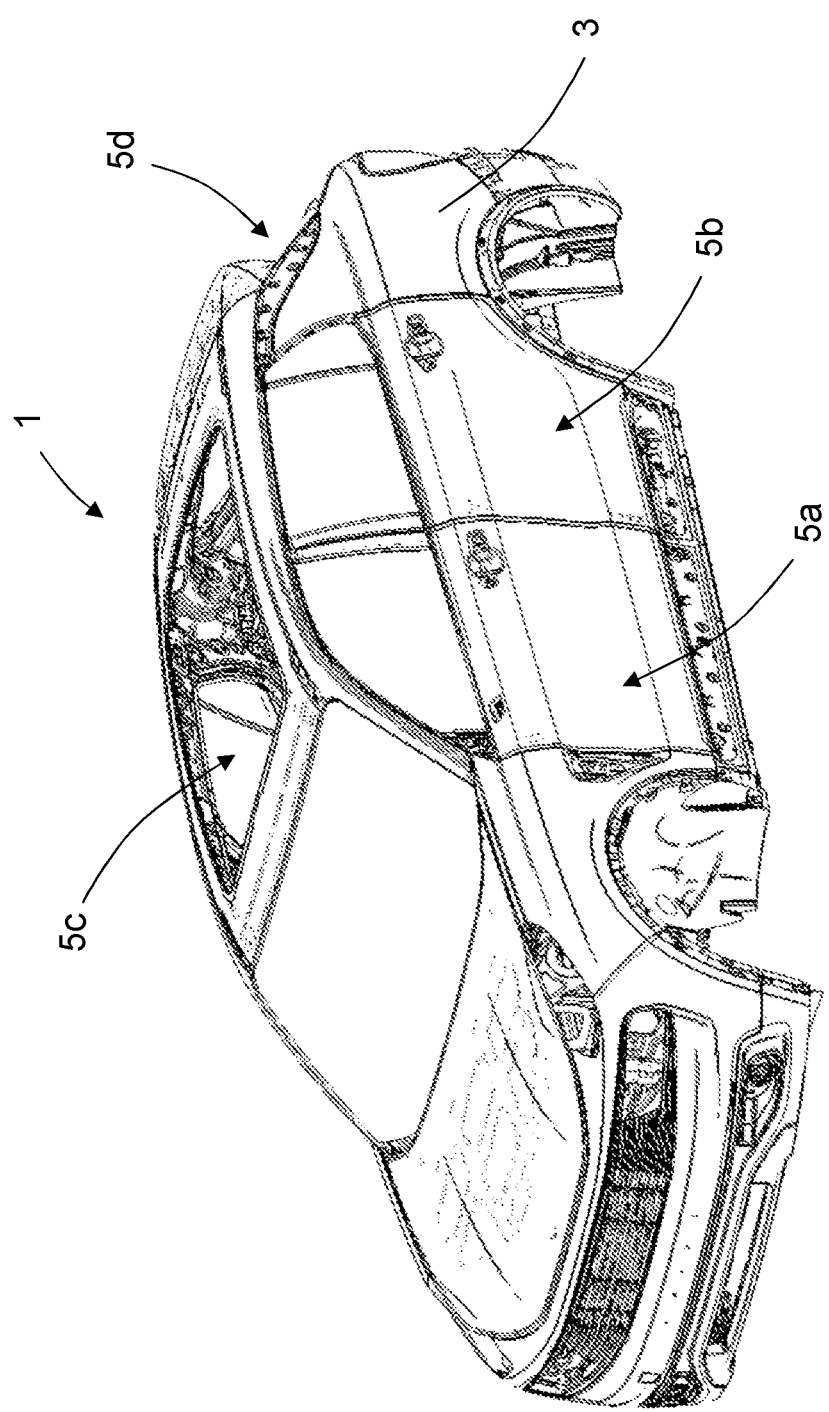
FIGS. 4A-4B show schematically, in perspective views a fully trimmed model of a car body construction according to the disclosure.
Figure 4B:
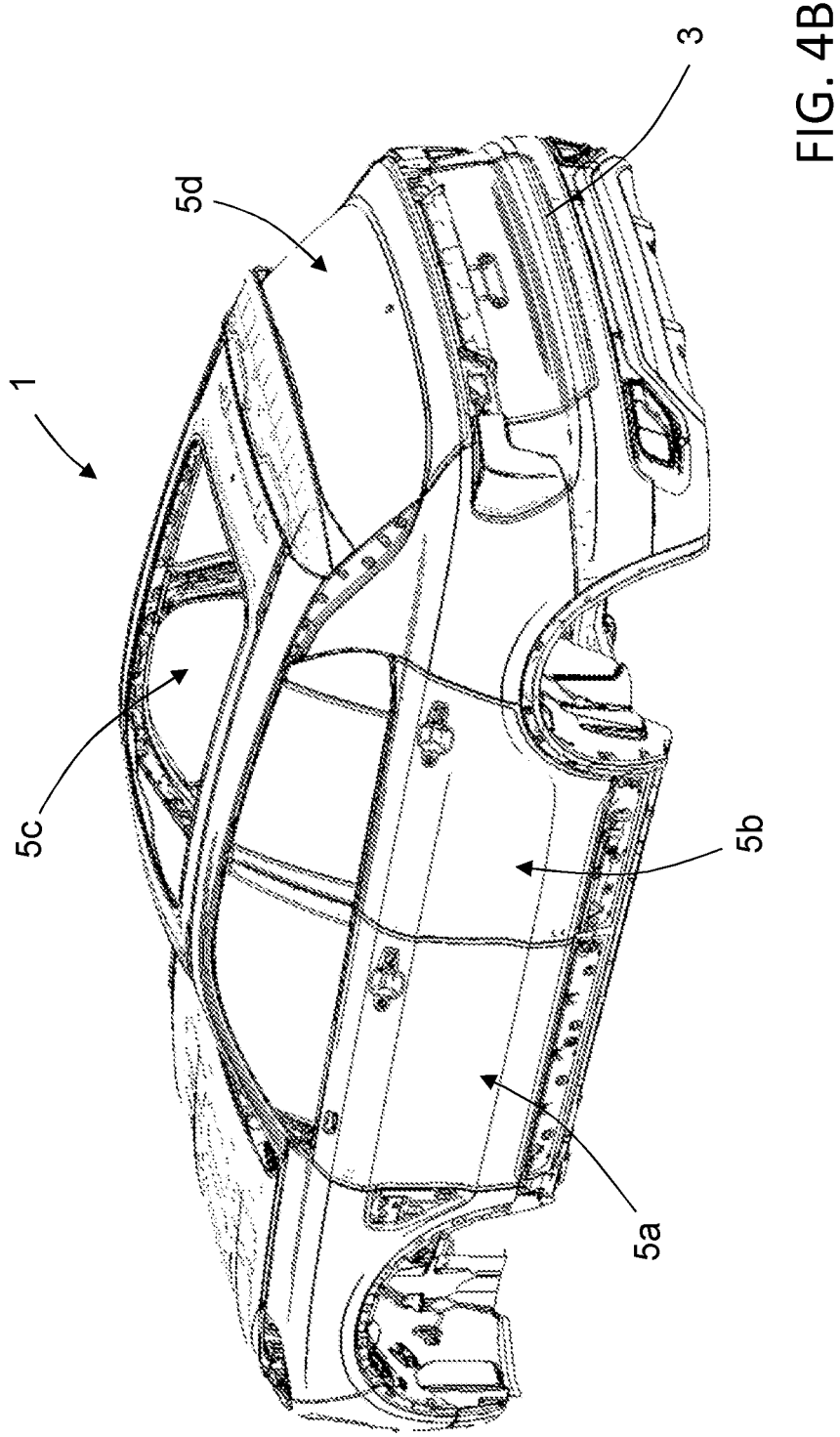

In the following, the fully trimmed model 3 of the car body construction 1 is referring to a car body defined as a complete car model without the chassis structure. With chassis structure is in this context meant the chassis frame plus the running gear like motor or engine, transmission, drive shaft, differential, suspension, or other chassis related components depending of the type of car construction. A fully trimmed model 3 of the car body construction 1 is exemplified in FIGS. 4A-4B. If desired, a part or some of the parts relating to the chassis may be included in the fully trimmed model 3.

The reduced model 4 of the car body construction 1 is referring to a car body defined as a basic car body structure including all glued windows and bolted structural assemblies, such as front and rear cross members. Such a car body construction 1 is sometimes referred to as a body-in-grey (BIG) car body and consists of a body-in-white (BIW) car body with the windows glued to and the bolted structural assemblies, such as front and rear cross members, attached to the BIW car body. A BIW car body is a car body construction in which the car body's sheet metal components have been welded together, where any moving parts, the motor or engine, the chassis or the chassis sub-assemblies, and the trim have not yet been added to the car body construction. A reduced model 4 of the car body construction 1 is exemplified in FIGS. 1A-3.

In order to optimize the different stages of a car construction different computer simulation models may be used, where the structural behaviour of the car is reproduced through mathematical or computerized modelling of the car body structure. There are both dynamic and static models available that may be used in the design and construction process, where traditionally the dynamic models give a better result for a final car body construction throughout the optimization process, since they are simulating true driving conditions in a better way. However, the dynamic models are often complex and time consuming to use, because a final car body construction with all structural parts and added components must be simulated. Therefore more simple static models may be used instead. One common way to determine the stiffness of the car body construction is to use a static torsional stiffness calculation model and to simulate the first torsional mode of a non-trimmed car body only, and through these models the stiffness of a complex body structure is in each case reflected by a single value only. The local stiffness in the different areas of the car, like for example the front part, the rear part, the lower part of the body and the upper part of the body are not specifically considered which makes the use of a static torsional stiffness calculation model and the use of a first torsional mode simulation unreliable.

A method for optimizing the construction of a car body according to the disclosure will be further described more in detail below. The method involves both a dynamic load simulation model and a static load simulation model, where the use of the load simulation models is combined in order to achieve a desired result. Through the combination of the load simulation models it is possible to simulate the fully trimmed model 3 of a first car body construction 1a in the dynamic load simulation model and the reduced model 4 of the first car body construction 1a in the static load simulation model, when a fully trimmed car body construction is available. The results from the simulation processes can thereafter be used as input values in the simulation of a similar alternative second car body construction 1b in the static load simulation model to achieve optimization results with high accuracy without using the dynamic load simulation model for the similar alternative second car body construction 1b.

When developing a new car model, a fully trimmed model 3 of the new car body construction is often not available in the early stages of the design and construction process. In the early stages only a reduced model of the new car body construction is available and it is therefore desired to optimize the reduced model before developing the fully trimmed model of the car. This is a much more efficient process with respect to time and costs involved in the design and construction process. Through the method according to the disclosure the load simulation of the reduced model 4 will give results that are valid also for the fully trimmed model 3, wherein an efficient optimization process is achieved.

If for example a car model has been fully developed by a car manufacturer, the construction of this fully developed car model can be used in the load simulation and optimization process also for similar car models with reliable results, where only the reduced model 4 is available for the similar car models. The fully developed car model is referred to as the first car body construction 1a and the constructional data and parameters for the first car body construction 1a are used in the load simulations. The similar car models are referred to as the similar alternative second car body construction 1b in the method. With the similar alternative second car body construction 1b is meant a car body construction that is different from the first car body construction 1a, but has the same or similar fundamental structure or geometry as the first car body construction 1a. In order for the method to deliver desired results, the first car body construction 1a and the similar alternative second car body construction may have essentially the same or similar geometry or size, be based on the same vehicle platform, or share general constructional features.

The method is based on simulations of deformations of one or more selected car body elements 2 of the car body. The one or more car body elements 2 could be parts of the car body for which the deformations are simulated, such as for example car body closure openings 5 or cross sections 6 of the car body. Other suitable car body elements 2 could also be chosen for determining the deformations of the car body in the simulations. Test simulations have throughout the development of the method shown that using car body closure openings 5 and/or cross sections 6 of the car body for determining the deformations of the car body construction 1 will give desired results.

In the method, the one or more car body elements 2 of the car body for which the deformations should be determined are selected. As described above the one or more selected car body elements 2 may for example be one or more car body closure openings 5 and/or one or more cross sections 6 of the car body construction 1.

Figure 2:
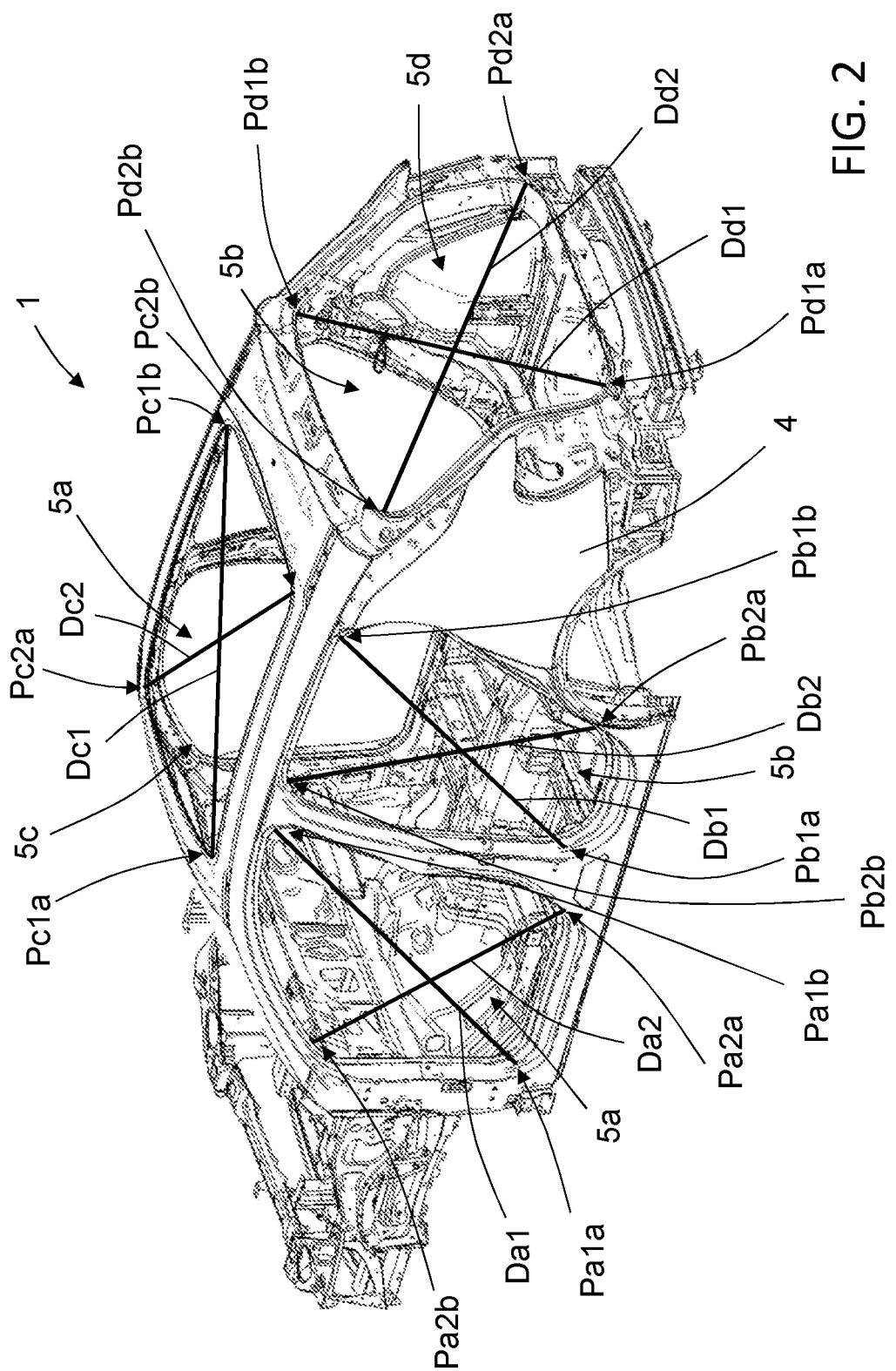
FIG. 2 shows schematically, in a perspective view a reduced model of a car body construction with car body closure openings according to the disclosure.

The one or more car body closure openings 5 used for determining the deformations are, as schematically shown in FIG. 2, one or more of a front door closure opening 5a, a rear door closure opening 5b, a roof closure opening 5c, and a rear closure opening 5d. It should be noted that the car body has two front door closure openings 5a arranged on each side of the car body and two rear door closure openings 5b arranged on each side of the car body. With each side is in this context meant the left side and the right side of the car respectively.

The front and rear door closure openings 5a, 5b are, as schematically shown in FIG. 2, referring to the closure openings in the car body where traditionally the front door and the rear door respectively are arranged in the car structure. Each of the door closure openings is surrounded by structural elements being part of the BIG car body. The front door closure openings 5a may, as shown in FIGS. 1A, 1B and 2, typically be defined by a front lower side frame structure 8, an A-pillar structure 9 with its downward extension 9a to the front lower side frame structure 8, the B-pillar structure 10, and a front section 12 of a roof rail structure 11. The rear door closure openings 5b may, as shown in FIGS. 1A, 1B and 2, typically be defined by a rear lower side frame structure 14, the B-pillar structure 10, a rear section 13 of the roof rail structure 11, and the C-pillar 15 with its downward extension 15a to the rear lower side frame structure 14.

The roof closure opening 5c is, as schematically shown in FIG. 2, referring to the opening of the car body where the roof top construction traditionally is placed in the car construction, and the roof closure opening 5c is surrounded by structural elements being part of the BIG car body. Typically the roof closure opening 5c is surrounded by a front header structure 16, rear header structure 17 and the roof rail structures 11 arranged on each side of the car connecting the front header structure 16 and the rear header structure 17, as shown for example in FIGS. 1A, 1B and 2.

The rear closure opening 5d is depending on the type of car construction referring to the boot lid closure opening, tailgate closure opening, or similar closure opening arranged in the rear part of the vehicle where the car's main storage space or cargo compartment usually is arranged. The rear closure opening 5d is surrounded by structural elements being part of the BIG car body. The construction and design of the rear closure opening may vary depending on the design of the vehicle and boot lids are typically arranged in sedan vehicles while tailgates are arranged in station wagons or hatchback types of vehicles. In the embodiment schematically shown in FIG. 2, the rear closure opening 5d is arranged as an opening for a tailgate in an SUV car construction. The rear closure opening 5d may, as shown in FIGS. 1A, 1B and 2, typically be defined by the rear header structure 17, a rear lower frame structure 18, and rear side structures 19 arranged on each side of the car connecting the rear header structure 17 and the rear lower frame structure 18. The rear side structures 19 may for example be constituted by the D-pillars in an SUV, station wagon, or hatchback car construction. In a sedan car construction the rear closure opening is defined by the car body frame structure encompassing the boot lid closure opening.

Figure 3:
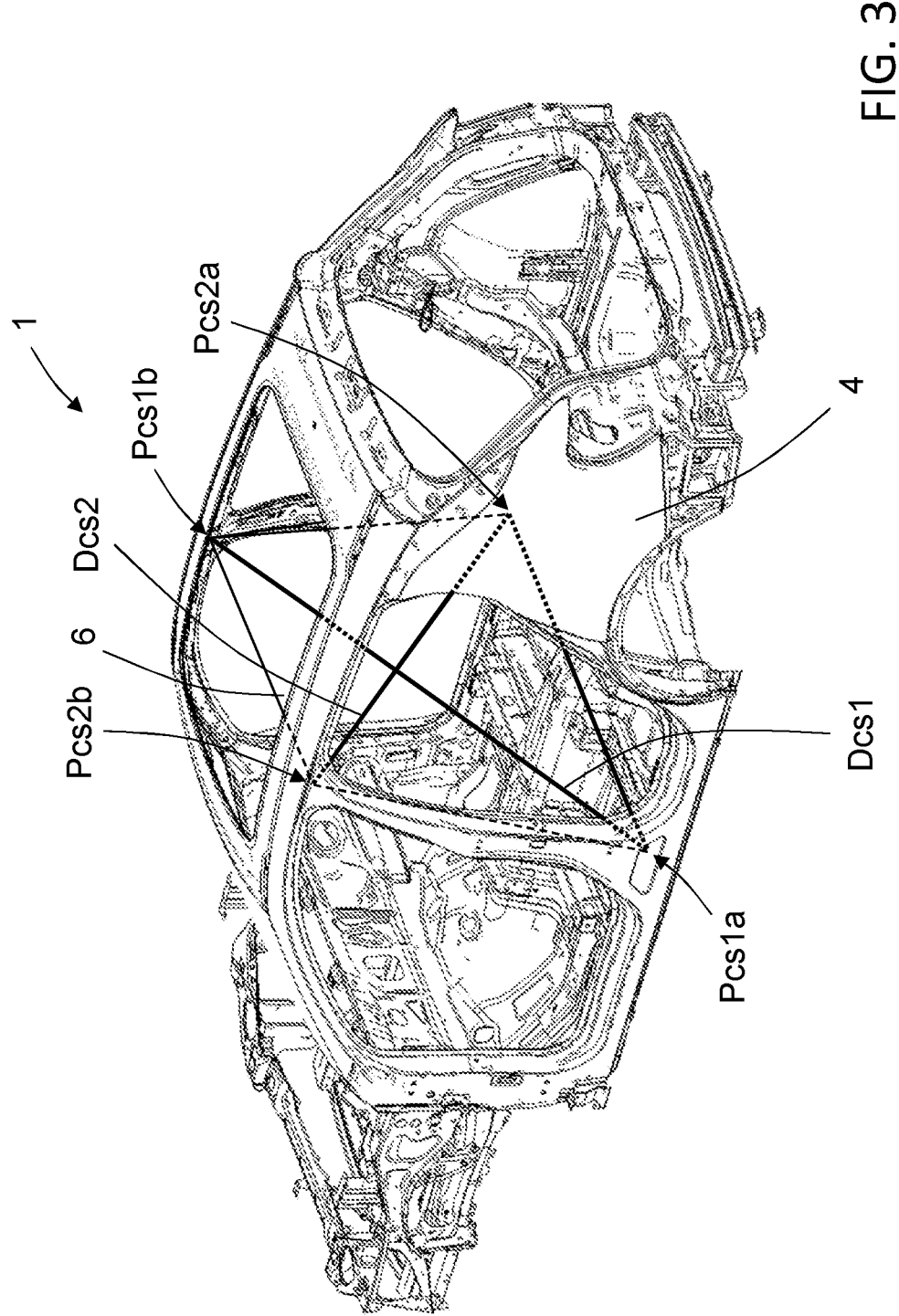
FIG. 3 shows schematically, in a perspective view a reduced model of a car body construction with a cross section according to the disclosure.

Further, according to the method, the cross sections 6 of the car body construction 1 may be used for determining the deformations of the car body in the simulations. The cross section 6 of the car body construction is defined as a cross-sectional plane arranged across the car body construction, as illustrated in FIG. 3.

In the simulations, the deformations of the selected car body closure openings are defined by deformation values which are determined through calculations of the deformations of diagonals D of each of the selected car body closure openings 5 and/or the selected cross sections 6, as will be further described below. In FIG. 2, the diagonals D for the different car body closure openings 5 are schematically shown, and in FIG. 3, the diagonals D for the cross section 6 is schematically shown.

The diagonals D for the front door closure openings 5*a* are schematically exemplified on the left side of the car body construction in FIG. 2. The diagonals for the right front door closure opening 5*a* have the same or a similar configuration. In the figure, two diagonals D are shown. A first front door closure opening diagonal Da1 stretches from the lower front part to the upper rear part of the front door closure opening 5*a*. More specifically the first front door closure opening diagonal Da1 stretches from a first measuring point Pa1*a* located in a region where the downward extension 9*a* of the A-pillar structure 9 is connected to the lower front side frame structure 8 to a second measuring point Pa1*b* located in a region where the front section 12 of the roof rail structure 11 is connected to the B-pillar structure 10.

A second front door closure opening diagonal Da2 stretches from the lower rear part to the upper front part of the front door closure opening 5*a*. More specifically the second front door closure opening diagonal Da2 stretches from a first measuring point Pa2*a* located in a region where the lower front side frame structure 8 is connected to the B-pillar structure 10 to a second measuring point Pa2*b* located in a region along the A-pillar 9.

It is possible depending on the design and construction of the car body to choose other measuring points for the diagonals D of the front door closure openings 5*a* if desired. The exact locations of the measuring points Pa1*a*, Pa1*b*, Pa2*a*, Pa2*b* for the front door closure opening diagonals Da1, Da2 are determined before the simulations are started and are maintained throughout the simulation process. The locations of the measuring points Pa1*a*, Pa1*b*, Pa2*a*, Pa2*b* for the front door closure opening diagonals Da1, Da2 may for example be chosen where the best responses for the deformations are assumed. The locations of the measuring points for the reduced model 4 of the similar alternative second car body construction 1*b* are chosen to be as similar as possible to the first car body construction 1*a*.

The diagonals D for the rear door closure openings 5*b* are schematically exemplified on the left side of the car body construction in FIG. 2. The diagonals for the right rear door closure opening 5*b* have the same or a similar configuration. In the figure, two diagonals D are shown. A first rear door closure opening diagonal Db1 stretches from the lower front part to the upper rear part of the rear door closure opening 5*b*. More specifically the first rear door closure opening diagonal Db1 stretches from a first measuring point Pb1*a* located in a region where the B-pillar structure 10 is connected to the lower rear side frame structure 14 to a second measuring point Pb1*b* located in a region where the rear section 13 of the roof rail structure 11 is connected to the C-pillar structure 15.

A second rear door closure opening diagonal Db2 stretches from the lower rear part to the upper front part of the rear door closure opening 5*b*. More specifically the second front door closure opening diagonal Db2 stretches from a first measuring point Pb2*a* in a region where the lower rear side frame structure 14 is connected to the C-pillar structure 15 to a second measuring point Pb2*b* in a region where the B-pillar structure 10 is connected to the rear section 13 of the roof rail structure 11.

It is possible depending on the design and construction of the car body to choose other measuring points for the diagonals D of the rear door closure openings 5*b* if desired. The exact locations of the measuring points Pb1*a*, Pb1*b*, Pb2*a*, Pb2*b* for the rear door closure opening diagonals Db1, Db2 are determined before the simulations are started and are maintained throughout the simulation process. The locations of the measuring points Pb1*a*, Pb1*b*, Pb2*a*, Pb2*b* for the rear door closure opening diagonals Db1, Db2 may for example be chosen where the best responses for the deformations are assumed. The locations of the measuring points for the reduced model 4 of the similar alternative second car body construction 1*b* are chosen to be as similar as possible to the first car body construction 1*a*.

The diagonals D for the roof closure opening 5*c* are schematically exemplified in FIG. 2. In the figure, two diagonals D are shown. A first roof closure opening diagonal Dc1 stretches from the front left part to the rear right part of the roof closure opening 5*c*. More specifically the first roof closure opening diagonal Dc1 stretches from a first measuring point Pc1*a* located in a region where the left front section 12 of the roof rail structure 11 is connected to the front header structure 16 to a second measuring point Pc1*b* located in a region where the right rear section 13 of the roof rail structure 11 is connected to the rear header structure 17.

A second roof closure opening diagonal Dc2 stretches from the front right part to the rear left part of the roof closure opening 5*c*. More specifically the second roof closure opening diagonal Dc2 stretches from a first measuring point Pc2*a* located in a region where the right front section 12 of the roof rail structure 11 is connected to the front header structure 16 to a second measuring point Pc2*b* located in a region where the left rear section 13 of the roof rail structure 11 is connected to the rear header structure 17.

It is possible depending on the design and construction of the car body to choose other measuring points for the diagonals D of the roof closure opening 5*c* if desired. The exact locations of the measuring points Pc1*a*, Pc1*b*, Pc2*a*, Pc2*b* for the roof closure opening diagonals Dc1, Dc2 are determined before the simulations are started and are maintained throughout the simulation process. The locations of the measuring points Pc1*a*, Pc1*b*, Pc2*a*, Pc2*b* for the roof closure opening diagonals Dc1, Dc2 may for example be chosen where the best responses for the deformations are assumed. The locations of the measuring points for the reduced model 4 of the similar alternative second car body construction 1*b* are chosen to be as similar as possible to the first car body construction 1*a*.

The diagonals D for the rear closure opening 5*d* are schematically exemplified in FIG. 2. In the figure, two diagonals D are shown. A first rear closure opening diagonal Dd1 stretches from the left lower part to the right upper part of the rear closure opening 5*d*. More specifically the first rear closure opening diagonal Dd1 stretches from a first measuring point Pd1*a* located in a region where the left rear side structure 19 is connected to the rear lower frame structure 18 to a second measuring point Pd1*b* located in a region where the right side structure 19 is connected to the rear header structure 17.

A second rear closure opening diagonal Dd2 stretches from the right lower part to the left upper part of the rear closure opening 5*d*. More specifically the second rear closure opening diagonal Dd2 stretches from a first measuring point Pd2*a* located in a region where the right rear side structure 19 is connected to the rear lower frame structure 18 to a second measuring point Pd2*b* located in a region where the left side structure 19 is connected to the rear header structure 17.

It is possible depending on the design and construction of the car body to choose other measuring points for the diagonals D of the rear closure opening 5*d* if desired, for example depending on the type of car and the design of the tailgate or boot lid closure opening. The exact locations of the measuring points Pd1*a*, Pd1*b*, Pd2*a*, Pd2*b* for the rear closure opening diagonals Dd1, Dd2 are determined before the simulations are started and are maintained throughout the simulation process. The locations of the measuring points Pd1*a*, Pd1*b*, Pd2*a*, Pd2*b* for the rear closure opening diagonals Dd1, Dd2 may for example be chosen where the best responses for the deformations are assumed. The locations of the measuring points for the reduced model 4 of the similar alternative second car body construction 1*b* are chosen to be as similar as possible to the first car body construction 1*a*.

The diagonals D for the cross section 6 are schematically exemplified in FIG. 3. In the figure, two diagonals D are shown. A first cross section diagonal Dcs1 stretches in the cross sectional plane from the left lower part to the right upper part of the car body construction 1. As an example, the first cross section diagonal Dcs1 stretches from a first measuring point Pcs1*a* located in a region where the lower part of the left B-pillar structure is arranged to a second measuring point Pcs1*b* located in a region where the upper part of the right B-pillar structure is arranged.

A second cross section diagonal Dcs2 stretches in the cross sectional plane from the right lower part to the left upper part of the car body construction 1. As an example, the second cross section diagonal Dcs2 stretches from a first measuring point Pcs2*a* located in a region where the lower part of the right B-pillar structure is arranged to a second measuring point Pcs2*b* located in a region where the upper part of the left B-pillar structure is arranged.

It is possible depending on the design and construction of the car body to choose other measuring points for the diagonals D of the cross section 6 if desired. It is possible to have two or more cross sections if desired depending on the number of measuring points needed for the calculations. The exact locations of the measuring points Pcs1*a*, Pcs1*b*, Pcs2*a*, Pcs2*b* for the cross section diagonals Dcs1, Dcs2 are determined before the simulations are started and are maintained throughout the simulation process. The locations of the measuring points Pcs1*a*, Pcs1*b*, Pcs2*a*, Pcs2*b* for the cross section diagonals Dcs1, Dcs2 may for example be chosen where the best responses for the deformations are assumed for each selected cross section 6. The locations of the measuring points for the reduced model 4 of the similar alternative second car body construction 1*b* are chosen to be as similar as possible to the first car body construction 1*a*.

When the car body elements 2, such as the car body closure openings 5 and/or cross sections 6 as described above, of the car body construction 1 for which the deformations should be determined have been selected, the simulation process is based on the deformations of the selected car body elements 2. A first set of deformation values DV1 of the selected car body elements 2 are calculated through simulating the fully trimmed model 3 of the first car body construction 1*a* in a complete dynamic load simulation model during a specified time period T, and the first set of deformation values DV1 comprise an array of deformation values for the selected car body elements.

The complete dynamic load simulation model is a dynamic calculation and simulation model in which according to the method, the fully trimmed model 3 of the first car body construction 1*a* is dynamically simulated in different driving conditions in specific driving cycles. In the model, the car is simulated in different driving conditions at different speeds during a certain time period. In the complete dynamic load simulation model the forces between the chassis of the car and the car body construction 1 are calculated in a multibody dynamics simulation, where the car is driven during a specific time period in different driving conditions. The simulation includes the road profile of different test tracks and the car is driven on the test tracks with the different road profiles to simulate real driving conditions. The forces between the chassis and the car body construction 1 that are resulting from the simulated driving of the car are as described above applied on the fully trimmed model 3 of the first car body construction 1*a* during the time period in a modal transient simulation. The modal transient simulation of the car body construction 1 is resulting in the first set of deformation values DV1 of the selected car body elements 2 during the time period. The first set of deformation values DV1 is calculated from a high number of sampled deformation values during the time period of the simulation, as will be further described below.

There are different dynamic load simulation models available for the multibody dynamics simulation and the modal transient simulation. As a non-limiting example the fully trimmed model 3 of the first car body construction 1*a* may be dynamically simulated in the models in different driving and road conditions, such as on a washboard in phase, a washboard out of phase, or a pave at speed levels between 40 and 50 km/h.

In the complete dynamic load simulation model the first set of deformation values DV1 is calculated. The first set of deformation values DV1 comprises the deformation values of all selected car body elements 2, and the deformation values used are the deformations of each diagonal of the selected car body elements 2, which deformations are part of the first set of deformation values DV1. If for example, the front door closure opening 5*a* and the rear closure opening 5*d* are the selected car body elements 2, the deformations of the first front door closure opening diagonal Da1, the second front door closure opening diagonal Da2, the first rear closure opening diagonal Dd1, and the second rear closure opening diagonal Dd2 are forming the first set of deformation values DV1. The deformations that are forming the first set of deformation values DV1 thus vary depending on which car body elements that are selected. The selection of car body elements can be made based on the type of optimization needed for the car body construction 1.

Depending on the optimization process, the fully trimmed model 3 of the first car body construction 1*a* may be a simulated car body construction or as an alternative a real fully trimmed car body construction arranged on a chassis structure for test purposes. As an alternative to computer simulations in the complete dynamic load simulation model, the first set of deformation values DV1 may instead be measured by sensors positioned on a real vehicle body structure. Thus, the first set of deformation values DV1 may be simulated or measured values. Also the measured first set of deformation values DV1 comprises in the same way as in the computer simulations the deformation values of all selected car body elements 2, and the deformation values used are the deformations of each diagonal of the selected car body elements 2, which deformations are part of the first set of deformation values DV1.

As described above, the first set of deformation values DV1 obtained are related to the fully trimmed model 3 of the first car body construction 1a. The first set of deformation values DV1 are based on measured values or simulated data. The simulated data may for example be established from computer simulations in the complete dynamic load simulation model of the fully trimmed model 3 of the first car body construction 1a in different driving conditions. Measured values may for example be collected with suitable sensors arranged on a real fully trimmed model 3 of the first car body construction 1a arranged on the chassis structure, where for example accelerometers are applied in one or more positions of the car body structure to determine the first set of deformation values DV1. Two or more spaced apart accelerometers may be used for determining the deformation between two or more positions on the real fully trimmed model 3 of the first car body construction 1a. The real fully trimmed model 3 of the first car body construction 1a may for example be driven on a test track in different road conditions, where the deformations are calculated from the values obtained from the accelerometers. The accelerometers are measuring the acceleration in each position of the vehicle body structure, and the measured values may be used for determining the first set of deformation values DV1.

In the method, one or more forces F that need to be applied in a reduced model 4 of the first car body construction 1a in an equivalent static load simulation model are determined in order to achieve a second set of deformation values DV2 of the selected car body elements 2 for the reduced model 4 of the first car body construction 1a. The second set of deformation values DV2 of the selected car body elements 2 should according to the method correspond to the first set of deformation values DV1 for the same selected car body elements 2. The second set of deformation values DV2 comprise in the same way as for the first set of deformation values DV1 an array of deformation values for the selected car body elements 2. When comparing the second set of deformation values DV2 with the first set of deformation values DV1, each deformation value in the respective arrays should be corresponding so that for example the deformation values for the front door closure opening 5a in the second set of deformation values DV2 have essentially identical or similar values as the deformation values for the front door closure opening 5a in the first set of deformation values DV1. According to the method, the corresponding deformation values may have slightly different values depending on the accuracy needed in the optimization process.

Figure 5:
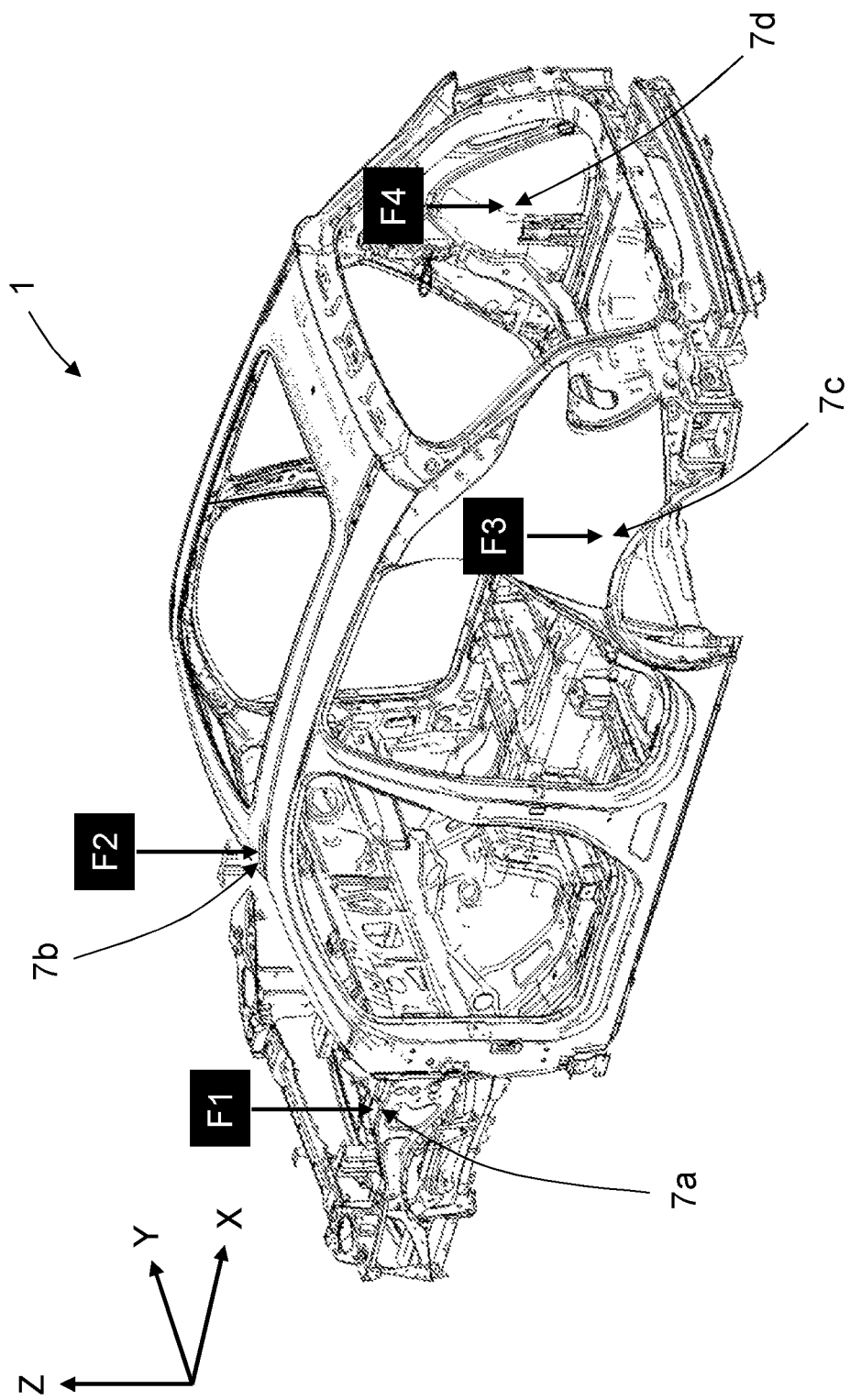
FIG. 5 shows schematically, in a perspective view a reduced model of a car body construction with applied forces according to the disclosure.

The one or more forces F that need to be applied in the reduced model 4 of the second car body constructions 1b in the equivalent static load simulation model may be applied to one or more strut mounting points 7 of the car body construction 1 of the reduced model 4 of the second car body construction 1b. The car has four different strut mounting points taking up both dynamic and static load during a driving cycle, and the strut mounting points are therefore suitable for the application of forces F in the equivalent static load simulation model. As shown in FIG. 5, four different forces F1, F2, F3, F4, may thus be applied to the reduced model 4 of the car body construction 1. A first force F1 is applied to a front left strut mounting point 7a, a second force F2 is applied to a front right strut mounting point 7b, a third force F3 is applied to a rear left strut mounting point 7c, and a fourth force F4 is applied to a rear right strut mounting point 7d, as shown in FIG. 5. The forces F1, F2, F3, F4, illustrated in FIG. 5 are only schematically symbolizing the force and torque vectors applied to the reduced model 4 of the car body construction 1. The forces applied may be resulting force vectors in three dimensions from forces and torques in all directions, rotations, and translations. Each of the forces F1, F2, F3, F4, may thus have force and torque components in the longitudinal direction X, the lateral direction Y, and the vertical direction Z as illustrated in FIG. 5. The forces F1, F2, F3, F4, are resulting force and torque vectors applied to the reduced model 4 of the car body construction 1. As an alternative, the one or more forces F may be applied to other suitable parts or locations of the car body construction than the strut mounting points if desired.

The equivalent static load simulation model is a static calculation and simulation model in which according to the method, the reduced model 4 of the first car body construction 1a is statically simulated in different conditions by applying the one or more forces F1, F2, F3, F4, in the equivalent static load simulation model. There are different equivalent static load simulation models available and suitable models may for example be a static inertia relief solution without restraints or boundary conditions, or a traditional static simulation with boundary conditions. In the equivalent static load simulation model, the one or more forces F1, F2, F3, F4, are applied to the reduced model 4 of the first car body construction 1a at specific positions of the first car body construction 1, such as the strut mounting points 7, and through the application of the one or more forces F1, F2, F3, F4, the deformations of the selected car body elements are simulated. In this step of the method, the static simulation process is repeated with different values of the one or more forces F1, F2, F3, F4, until the second set of deformation values DV2 are achieved, which second set of deformation values correspond to the first set of deformation values DV1. Once the one or more forces F1, F2, F3, F4, are determined, the one or more forces F1, F2, F3, F4, will be used for the optimization of the similar alternative second car body construction 1b in the equivalent static load simulation model.

As described above, the first car body construction 1a is thus used for determining the forces that should be used in the optimization process of the reduced model of the similar alternative second car body construction 1b in the equivalent static load simulation model. The forces are determined through the first set of deformation values DV1 calculated in the complete dynamic load simulation model for the fully trimmed model 3 of the first car body construction 1a, and further through the calculation of the second set of deformation values DV2 for the reduced model 4 of the first car body construction 1a in the equivalent static load simulation model.

When the similar alternative car body construction 1b should be optimized, the one or more determined forces F1, F2, F3, F4, are applied, in an equivalent static load optimization simulation step, to the reduced model 4 of the similar alternative second car body construction 1b in the equivalent static load simulation model. When the one or more determined forces F1, F2, F3, F4, are applied to the reduced model 4 of the similar alternative second car body construction 1b in the equivalent static load simulation model, a third set of deformation values DV3 of the selected car body elements 2 for the reduced model 4 of the second car body construction 1b are achieved. The third set of deformation values DV3 are used for determining how optimized the reduced model 4 of the second car body construction 1b is, and it is further determined if the third set of deformation values DV3 are within a predetermined desired deformation value range. The predetermined desired deformation value range is a value range for the third set of deformation values DV3 and could for example be a predetermined value range in which the car body construction 1 meets the desired construction demands with respect to stiffness and crashworthiness. The predetermined value range for the third set of deformation values DV3 may differ between different constructions and designs of the car body. The target is to achieve a third set of deformation values DV3 that are as close as possible to a desired set of deformation values. Depending on the car design, the desired set of deformation values may be based on the second set of deformation values DV2 for the reduced model 4 of the first car body construction 1a. As a non-limiting example, the predetermined value range may be based on the second set of deformation values DV2 for the reduced model 4 of the first car body construction 1a with a deviation in absolute or relative deformation of not more than 10% for each deformation value in the second set of deformation values DV2. As an alternative, the desired set of deformation values may be a set of target deformation values for the reduced model 4 of the second car body construction 1b, where it is believed that the car body construction is optimized. In this alternative example, the predetermined value range may be based on the set of target deformation values for the reduced model 4 of the second car body construction 1b with a deviation in absolute or relative deformation of not more than 10% for each deformation value in the set of target deformation values. Other percentages may be used when determining the predetermined value range.

The third set of deformation values DV3 comprise in the same way as for the first set of deformation values DV1 and the second set of deformation values DV2 an array of deformation values for the selected car body elements 2. When determining if the third set of deformation values DV3 are within a predetermined desired deformation value range, the third set of deformation values DV3 may for example be compared with the second set of deformation values DV2, where each deformation value in the respective arrays should be corresponding so that for example the deformation values for the front door closure opening 5a in the third set of deformation values DV3 have similar values as the deformation values for the front door closure opening 5a in the second set of deformation values DV2.

Further, according to the method, if the third set of deformation values DV3 is not within the predetermined desired deformation value range, one or more constructional parameters of the reduced model 4 of the second car body construction 1b may, as described above, be changed in order to achieve one or more modified second car body constructions 1b in the reduced model 4. The equivalent static load optimization simulation step for the modified second car body constructions 1b in the reduced model 4 may in this way be repeated until a new third set of deformation values DV3 is achieved within the predetermined desired deformation value range.

The third set of deformation values DV3 may at a later stage in the construction process be verified if desired when a fully trimmed model 3 of the second car body construction or a fully trimmed model 3 of the modified second car body constructions is available. This can be a useful way to verify the models and methodology used. In this way, the method may further comprise the step: verifying that the third set of deformation values DV3 of the selected car body elements 2 of the fully trimmed model 3 of the second car body construction 1b or the fully trimmed model 3 of the modified second car body constructions 1b are within a predetermined deformation value range for the same car body elements 2, through simulating the fully trimmed model 3 of the second car body construction 1b or the fully trimmed model 3 of the modified second car body constructions 1b in the complete dynamic load simulation model during the specified time period T.

The sets of deformation values DV1, DV2, DV3 of the selected car body elements 2 are in the simulations or through measurements calculated as an absolute change in deformations or a relative change in deformations of a distance between two selected measuring points on the selected car body elements 2. As described above, the diagonals D of the selected car body closure openings 5 and/or the diagonals D of each of the selected cross sections 6 are used for determining the absolute or relative changes in deformations. The absolute or relative change in deformations of the selected diagonals between the measuring points of the selected car body elements 2 are thus used for the simulations in the dynamic simulation model and the equivalent static simulation model. Since the absolute change or relative change in deformations is used, these values may be both positive and negative. The relative change in distance of the diagonals between the measuring points is calculated as the difference between the deformed distance between the measuring points and the non-deformed distance between the measuring points, which difference is divided with the non-deformed distance between the measuring points.

In the complete dynamic load simulation model, a number of different deformation values are calculated and sampled during the time period, with a specific sampling frequency. As a non-limiting example, a sampling frequency of 500 Hz during a time period of 10 seconds may be used. Since the method is based on the absolute or relative change in deformation value for each diagonal, the sampled values need to be transformed into a single value for each diagonal so that the dynamic simulation values can be compared with the values in the static simulation steps. In the complete dynamic load simulation model, the first set of deformation values DV1 are established through a filtered deformation value calculation for each selected car body element 2. The filtered deformation values for the selected car body elements 2 are established through collecting the simulated first set of deformation values DV1 of each selected car body element 2 during the specified time period T, and the filtered deformation values for the diagonals of the selected car body elements 2 are calculated as the mean value of a percentage of the simulated highest deformation values DV1 during the specified time period T. This method is used for excluding the lowest deformation values that are not impacting the deformations of the car body to a high extent. As a non-limiting example, 30% of the simulated highest deformation values DV1 during the specified time period T may be used for the calculations. Other percentages are also possible to use, depending on the type of test track and time period used.

This method of establishing the filtered deformation values also applies to the third set of deformation values DV3, when the third set of deformation values DV3 are verified in the complete dynamic load simulation model.

In order to establish if it is relevant or possible to use the equivalent static load simulation model with desired results, it is possible to make an assessment based on the simulation of the car body construction 1 in the complete dynamic load simulation model, by using deformation values calculated when determining the first set of deformation values DV1. A suitable method for this is to base the assessment on calculations of Max Principal Response Vectors MRV and Vector Participation VPA from the deformation values during the time period used for determining the first set of deformation values DV1. In this way, the possibility of calculating an equivalent static load in the equivalent static load simulation model is assessed through calculating the MRV and the VPA from the sampled deformation values forming the first set of deformation values DV1, as will be further described below in relation to FIGS. 6A-6E and 7A-7E.

In FIGS. 6A-6B, the first front door closure opening diagonal Da1 of the front door closure opening 5a is schematically shown as an example. In FIG. 6A a side view of the front door closure opening 5a is schematically shown, and in FIG. 6B a front view of the front door closure opening 5a is schematically shown. In FIG. 6A an outer contour of the front door closure opening 5a is illustrated, and in FIG. 6B only a part of the outer contour of the front door closure opening 5a is illustrated. The contour and shape of the different car body closure openings 5 may vary depending on the design of the car body. During the simulation of the fully trimmed model 3 of the first car body construction 1a in the complete dynamic load simulation model during the time period T, the car body closure openings of the car body will be deformed in different ways depending on the forces acting on the car body. The diagonals of the different car body closure openings 5 will then also be deformed and the deformations of the diagonals can be used in the assessment of the relevance or possibility to use the equivalent static load simulation model. The different deformations of the car body closure openings during the time period T can be calculated and represented as a relative displacement of each diagonal. More specifically, the relative displacement of each diagonal is represented by a point corresponding to the mid-point of the diagonal. This will in the following be described and exemplified with the first front door closure opening diagonal Da1 of the front door closure opening 5a. However the same reasoning can be applied for all diagonals of the car body closure openings 5 and cross sections selected in the simulations.

Figure 6E:
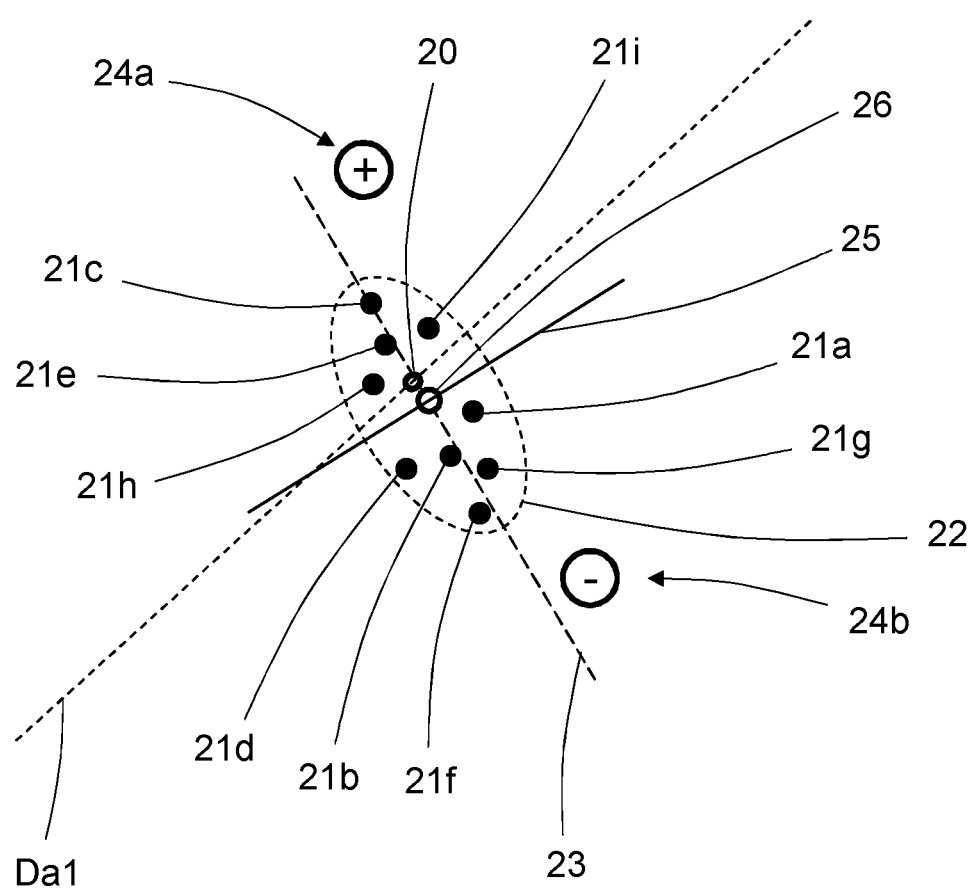

In FIGS. 6A-6B, the diagonal mid-point 20 of the first front door closure opening diagonal Da1 of the left front door closure opening 5a is schematically shown, and the diagonal mid-point 20 is the middle point of the first front door closure opening diagonal Da1 when the car body closure opening is not deformed. The diagonal mid-point 20 is thus dividing the first front door closure opening diagonal Da1 in two equally long parts when there is no deformation of the front door closure opening 5a. During the simulation process the diagonal mid-point 20 will, due to the forces acting on the car body construction resulting in the deformations of the front door closure opening 5a, be moving in a space and the diagonal mid-point 20 will have different locations at different time steps in space as indicated by the mid-point locations 21a-i in FIG. 6E.

When the simulation is started, the diagonal mid-point 20 will have its initial position or location when there are no deformations of the front door closure opening 5a, as illustrated in FIGS. 6A-6E. The location of the diagonal mid-point 20 is during the simulation determined at the different time steps involved in the simulation process. The location of the diagonal mid-point 20 may vary depending of the forces acting on the car body, and the mid-point locations 21 for the different time steps may vary depending on the sampling frequency and the time of the dynamic simulation process. A mid-point location 21 is thus the position of the diagonal mid-point 20 at a certain time step during the simulation. As an example, after a first time step Ta, the diagonal mid-point 20 will have the mid-point location 21a, and after the second time step Tb, the diagonal mid-point 20 will have the mid-point location 21b. In FIGS. 6C-6E only nine different time steps are exemplified by the mid-point locations 21a-i. In reality many thousands of mid-point locations 21 may be calculated during the simulation process, and if for example a sampling frequency of 500 Hz during a time period of 10 seconds is used, there will be 5,000 mid-point locations 21. All mid-point locations 21 during the simulation are together forming a three-dimensional point cloud 22 in space, as indicated with the dotted area in FIGS. 6C-6E. The point cloud 22 can be seen as a three-dimensionally shaped body in space formed by the different mid-point locations 21. According to the method, a main direction 23 and a point cloud mid-point 26 in space of the point cloud 22 is calculated based on a Principal Component Analysis (PCA), which is a well-known calculation method.

The point cloud mid-point 26 is the calculated middle point of the point cloud 22 according to the PCA calculation, and the main direction 23 is a vector in the space. The vector of the main direction 23 is lying on or passing through the point cloud mid-point 26, as shown in FIGS. 6C-6E. Theoretically it may be possible that the point cloud mid-point 26 and the diagonal mid-point 20 have the same position in space. However, due to frictional and gravitational forces the point cloud mid-point 26 and the diagonal mid-point 20 are often separated from each other, as illustrated in FIGS. 6C-6E.

In FIG. 6C a side view of the front door closure opening 5a with the point cloud 22 is schematically shown, and in FIG. 6D a front view of the front door closure opening 5a with the point cloud 22 is schematically shown. In FIG. 6C the outer contour of the front door closure opening 5a is illustrated, and in FIG. 6D only a part of the outer contour of the front door closure opening 5a is illustrated. The contour and shape of the different car body closure openings 5 may as described above vary depending on the design of the car body. In FIG. 6E a side view of the point cloud 22 with the different exemplified mid-point locations 21a-i is schematically shown.

Further, according to the method, a positive side 24a of the main direction 23 and a negative side 24b of the main direction 23 are defined, as illustrated in FIGS. 6C-6E. As shown in FIGS. 6C-6E, a plane 25 normal to the main direction 23, which plane 25 is passing through the point cloud mid-point 26, is used to divide the main direction 23 into the positive side 24a of the main direction 23 and the negative side 24b of the main direction 23. According to the method, the mid-point locations 21a-i are located on the positive side 24a of the main direction 23 if having a position in space on the defined positive side 24a of the plane 25. In the same way, the mid-point locations 21a-i are located on the negative side 24b of the main direction 23 if having a position in space on the defined negative side 24b of the plane 25. The plane 25 normal to the main direction 23 and passing through the point cloud mid-point 26 is thus dividing the point cloud 22 into the positive side 24a and the negative side 24b, and used for determining if a mid-point location 21 is located on the defined positive side 24a of the main direction 23 or on the defined negative side 24b of the main direction 23.

As illustrated in the side views in FIGS. 6C and 6E, the left upper side of the plane 25 is defined as the positive side 24a of the main direction 23. In the example shown in FIG. 6E, four mid-point locations 21c, 21e, 21h, 21i, are located on the positive side 24a of the main direction 23, since they have a position in space on the defined positive side 24a of the main direction 23. The right lower side of the plane 25 is defined as the negative side 24b of the main direction 23. In the example shown in FIG. 6E, five mid-point locations 21a, 21b, 21d, 21f, 21g, are located on the negative side 24b of the main direction 23, since they have a position in space on the defined negative side 24b of the main direction 23.

It is according to the method possible to define the positive side 24a of the main direction 23 and the negative side 24b of the main direction 23 in the opposite ways. For the front door closure opening 5a shown in the side views in FIGS. 6C and 6E, the positive side 24a of the main direction 23 will then instead be defined as the right lower side of the plane 25, and the negative side 24b of the main direction 23 will then instead be defined as the left upper side of the plane 25.

The point cloud 22, the main direction 23, the point cloud mid-point 26, and the plane 25 are calculated for all diagonals of the selected closure openings 5 during the simulation process. Further, the positive side 24a of the main direction 23 and the negative side 24b of the main direction 23 will be defined for all diagonals of the selected closure openings. As an alternative, a selected number of diagonals of the selected closure openings 5 may be used instead.

Based on the selected number of car body closure openings 5 and the diagonals D of the selected car body closure openings 5, a so called Max Principal Response Vector MRV can be defined for each time step during the simulation of the of the fully trimmed model 3 of the first car body construction 1a in the complete dynamic load simulation model. The Max Principal Response Vector contains the information if the mid-point location 21 is on the positive side 24a of the main direction 23 or on the negative side 24b of the main direction 23 for each selected diagonal D at a specific time step. If the mid-point location 21 at a specific time step is on the positive side 24a of the main direction 23, a positive value will be allocated to the mid-point location 21 for that specific time step independent of where in space on the positive side 24a of the main direction 23 the mid-point location 21 is positioned. In the same way, if the mid-point location 21 at a specific time step is on the negative side 24b of the main direction 23, a negative value will be allocated to the mid-point location 21 for that specific time step independent of where in space on the negative side 24b of the main direction 23 the mid-point location 21 is positioned. Thus, the Max Principal Response Vector contains the information if the relative displacement of a specific diagonal D of a car body closure opening 5 at a specific time step is positive or negative. In this way, the Max Principal Response Vector is a simplified description of a specific deformation state for all selected closure openings at a specific time step, as will be further described below.

The MRV will be described more in detail with the example shown in FIGS. 7A-7E. In FIG. 7A, the Max Principal Response Vector MRVa for the first time step Ta is shown. In this example, the first front door closure opening diagonal Da1 and the second front door closure opening diagonal Da2 of one of the front door closure openings 5a, the first rear door closure opening diagonal Db1 and the second rear door closure opening diagonal Db2 of one of the rear door closure openings 5b, and the first rear closure opening diagonal Dd1 and the second rear closure opening diagonal Dd2 of the rear closure opening 5d have been selected for the simulations in order to illustrate the Max Principal Response Vector. Other closure openings may if desired be selected instead. In FIG. 7A, the first front door closure opening diagonal Da1 has a negative mid-point location 21a, and is therefore allocated a negative value. The locations of the mid-points for the other diagonals are not shown in the figures, but are instead exemplified in FIG. 7A to better explain the principles behind the Max Principal Response Vector. As further shown in FIG. 7A, also the second front door closure opening diagonal Da2 and the first rear closure opening diagonal Dd1 have in the example negative mid-point locations with allocated negative values. The first rear door closure opening diagonal Db1, the second rear door closure opening diagonal Db2, and the second rear closure opening diagonal Dd2 have in the example positive mid-point locations with allocated positive values. The mid-point locations for these diagonals have been calculated in the same way as for the first front door closure opening diagonal Da1. The Max Principal Response Vector can be seen as an array or string of values containing the positive and/or negative values for the selected diagonals D, depending on the deformations of the diagonals. In the example in FIGS. 7A-7E, the string of values V for the respective diagonals D in the different time steps can be written in the form:

$$MRV=[VDa1, VDa2, VDb1, VDb2, VDd1, VDd2]$$

In the example in FIG. 7A, the string of positive and/or negative values for the Max Principal Response Vector MRVa for the first time step Ta can in this way be described as:

$$MRVa=[-,-,+,+,-,+]$$

In FIG. 7B, the Max Principal Response Vector MRVb for the second time step Tb is shown for the same selected car body closure openings. In the same way as described in relation to FIG. 7A above, the values for the exemplified Max Principal Response Vector MRVb for the second time step Tb can be described as:

$$MRVb=[-,+,-,+,-,+]$$

In FIG. 7C, the Max Principal Response Vector MRVc for the third time step Tc is shown for the same selected car body closure openings. In the same way as described in relation to FIGS. 7A-7B above, the values for the exemplified Max Principal Response Vector MRVc for the third time step Tc can be described as:

$$MRVc=[+,-,+,+,+,-]$$

In FIG. 7D, the Max Principal Response Vector MRVd for the fourth time step Td is shown for the same selected car body closure openings. In the same way as described in relation to FIGS. 7A-7C above, the values for the exemplified Max Principal Response Vector MRVd for the fourth time step Td can be described as:

$$MRVd=[-,-,+,+,-,+]$$

In FIG. 7E, the Max Principal Response Vector MRVn for a time step Tn is shown for the same selected car body closure openings. Time step Tn is used as the n:th time step for illustrating a time step occurring during the simulation. In the same way as described in relation to FIGS. 7A-7D above, the values for the exemplified Max Principal Response Vector MRVn for the n:th time step Tn can be described as:

$$MRVn=[+,+,-,-,+,-]$$

As described above, according to the method, a MRV is calculated for each time step. All calculated MRVs are further analysed and sorted according to their deformation state. In this way a number of different unique MRVs can be identified. For example, according to the example in FIGS. 7A-7E, MRVa is identical to MRVd. This means that for the first time step Ta and the fourth time step Td, the Max Principal Response Vectors are having the same unique value string, or shape if referred to the shape of the Max Principal Response Vectors in FIGS. 7A and 7D. The Max Principal Response Vectors MRVb and MRVc for the second time step Tb and the third time step Tc, shown in FIGS. 7B and 7C, are having their own unique value string or shape. During the simulation, depending on the sampling frequency and time period, many thousand Max Principal Response Vectors can be calculated from the deformations of the car body closure openings 5.

All Max Principal Response Vectors are sorted according to their deformation state, as described above, where each unique Max Principal Response Vector is represented by their unique value string or shape. In the Vector Participation, the occurrence of each unique Max Principal Response Vector is plotted. The number of all plotted Max Principal Response Vectors is equal to the number of all the time steps representing the complete time period for the simulation. The Vector Participation is thus representing 100% of the time steps. The Vector Participation shows how often a specific unique Max Principal Response Vector occurs during the time period T.

According to the method, when the Vector Participation is plotted, if a fraction of two Max Principal Response Vectors is equal to minus one, then the two Max Principal Response Vectors are assumed to be identical. This means that mirrored Max Principal Response Vectors are identical in the Vector Participation. As an example, the Max Principal Response Vector MRVn at time step Tn shown in FIG. 7E is therefore assumed to be identical to the Max Principal Response Vectors MRVa and MRVd at time steps Ta and Td shown in FIGS. 7A and 7D. As can be seen in the figures, the vectors are having the same shape even if being mirrored. The Max Principal Response Vectors are thus assumed be identical when the fraction of two Max Principal Response Vectors is equal to minus one. In other words, if each positive value in the unique Max Principal Response Vector string is exchanged for a negative value and each negative value in the unique Max Principal Response Vector string is exchanged for a positive value, the Max Principal Response Vector is assumed to be identical.

The Max Principal Response Vectors MRVa, MRVd and MRVn are thus identical, which can be seen in the strings below and in FIGS. 7A, 7D and 7E.

MRV$a$=[−,−,+,+,−,+]

MRV$d$=[−,−,+,+,−,+]

MRV$n$=[+,+,−,−,+,−]

It has been found in the development of the method that if in the Vector Participation it is established that a unique Max Principal Response Vector is occurring to a high degree in the different time steps, this is indicating that it is relevant or possible to use the equivalent static load simulation model with desired results. The occurrence of a specific Max Principal Response Vector to a high degree is indicating that the car body construction 1 has a specific preferred deformation pattern during many time steps, which is indicating that the forces applied in the equivalent static load simulation model with a high probability will give desired results. Thus, based on the percentage value of the occurrence of a specific unique Max Principal Response Vector the assessment of the possibility for creating an equivalent static load simulation can be performed. According to the method, if a unique Max Principal Response Vector is represented in at least 40% of the time steps, this is indicating that with a high probability the equivalent static load simulation model will give desired results. As an example, if the unique Max Principle Response Vector exemplified in FIGS. 7A, 7D and 7E at the time steps Ta, Td and Tn are represented in at least 40% of all time steps during the simulation, this will indicate that the equivalent static load simulation model will give desired results. If even a higher probability is desired, other percentages may be used, such as for example if a unique Max Principal Response Vector is represented in at least 50% of the time steps. If, on the other hand, it could not be established that a unique Max Principal Response Vector is occurring to a high degree in the different time steps, this may be indicating that it is not relevant or possible to use the equivalent static load simulation model with desired results.

It should be understood that the number of values in each Max Principal Response Vector varies depending on how many car body closure openings and diagonals that are selected in the simulation. The same reasoning as described above in relation to the example also applies for Max Principal Response Vectors having other configurations than the ones described. Also, the same reasoning for the Max Principal Response Vector and Vector Participation can be applied for the cross sections 6.

The method steps for establishing the relevance or possibility to use the equivalent static load simulation model with desired results through the calculations of the Max Principal Response Vectors MRV and Vector Participation VPA can be summarized as described in the paragraphs below.

The method for establishing the relevance or possibility of using an equivalent static load simulation model when optimizing the construction of a car body through simulations of deformations of one or more selected car body elements 2 of the car body is comprising one or more of the steps;

selecting the one or more car body elements 2 of the car body for which the deformations should be determined;

defining at least one diagonal D of each selected car body element 2, and identifying the diagonal mid-point 20 of each defined diagonal D, where the diagonal mid-point 20 is the middle point of each defined diagonal D when the selected car body elements 2 are in a non-deformed state;

simulating a fully trimmed model 3 of a first car body construction 1$a$ in a complete dynamic load simulation model during a specified time period T, and at predetermined time steps during the time period T identifying mid-point locations 21 for each defined diagonal D at the predetermined time steps, where the identified mid-point locations 21 of each defined diagonal D are forming a three-dimensional point cloud 22 for each defined diagonal D during the simulation;

calculating a main direction 23 and a point cloud mid-point 26 of each point cloud 22, where a vector of the main direction 23 is passing through the point cloud mid-point 26;

defining a positive side 24$a$ of the main direction 23 and a negative side 24$b$ of the main direction 23 for each point cloud 22, where for each point cloud 22$a$ plane 25 normal to the main direction 23 passing through the point cloud mid-point 26 is dividing the main direction 23 into the positive side 24$a$ of the main direction 23 and the negative side 24$b$ of the main direction 23;

allocating for each point cloud 22 at each time step a positive value for each mid-point location 21 located on the positive side 24$a$ of the main direction and a negative value for each mid-point location 21 located on the negative side 24$b$ of the main direction 23;

defining a Max Principal Response Vector MRV at each time step during the simulation of the fully trimmed model 3 of the first car body construction 1a in the complete dynamic load simulation model, where the Max Principal Response Vector MRV at each specific time step contains a value string with the allocated positive and negative values of the mid-point locations 21 for the point clouds 22 of the defined diagonals D for that specific time step, describing a deformation state of the selected car body elements 2 at the specific time step;

sorting the Max Principal Response Vectors MRV for all time steps during the time period T according to their deformation state, where the Max Principal Response Vector MRV for each time step is represented by its value string;

plotting in the Vector Participation VPA the occurrence of each unique Max Principal Response Vector MRV for all time steps during the time period T, where the number of all plotted Max Principal Response Vectors MRV is equal to the number of all the time steps representing the complete time period T for the simulation, where in the Vector Participation VPA if a fraction of two Max Principal Response Vectors MRV is equal to minus one the two Max Principal Response Vectors MRV are assumed to be identical;

identifying the occurrence in the Vector Participation VPA of each unique Max Principal Response Vector MRV for all time steps during the time period T, wherein a representation of a unique Max Principal Response Vector above a percentage of all the time steps is indicating that the equivalent static load simulation model will give desired results with a high probability, where the percentage of the representation is at least 40% of all the time steps, or at least 50% of all the time steps.

The method for establishing the relevance or possibility of using an equivalent static load simulation model may further comprise one or more of the steps;

selecting one or more car body closure openings 5 as the one or more selected car body elements 2, where the one or more car body closure openings 5 are one or more of a front door closure opening 5a, a rear door closure opening 5b, a roof closure opening 5c, and a rear closure opening 5d;

selecting one or more cross sections 6 as the one or more selected car body elements 2;

calculating the main direction 23 and the point cloud mid-point 26 of the point cloud 22 based on a Principal Component Analysis PCA.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a system for simulation, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor(s) (associated with the simulation system) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Car body construction
2: Car body element
3: Fully trimmed model
4: Reduced model
5: Car body closure opening
5a: Front door closure opening
5b: Rear door closure opening
5c: Roof closure opening
5d: Rear closure opening
6: Cross section
7: Strut mounting point
8: Lower front side frame structure
9: A-pillar structure
9a: Downward extension, A-pillar structure
10: B-pillar structure
11: Roof rail structure
12: Front section, roof rail structure
13: Rear section, roof rail structure
14: Lower rear side frame structure
15: C-pillar structure
15a: Downward extension, C-pillar structure
16: Front header structure 17: Rear header structure
18: Rear lower frame structure
19: Rear side structures
20: Diagonal mid-point
21: Mid-point location
22: Point cloud
23: Main direction
24a: Positive side of main direction
24b: Negative side of main direction
25: Plane
26: Point cloud mid-point

The invention claimed is:

1. A method for optimizing the construction of a car body through determining deformations of one or more selected car body elements of the car body, the method comprising the steps:
    selecting the one or more car body elements of the car body for which the deformations should be determined,
    obtaining a first set of deformation values of the selected car body elements from a fully trimmed model of a first car body construction, wherein the first set of deformation values are based on measured dynamic values or simulated dynamic data in a complete dynamic load simulation model-during a specified time period,
    determining one or more forces to be applied to a reduced model of the first car body construction in an equivalent static load simulation model to achieve a second set of deformation values of the selected car body elements for the reduced model of the first car body construction, wherein the second set of deformation values of the selected car body elements are corresponding to the first set of deformation values for the same selected car body elements,
    applying, in the equivalent static load simulation model, the one or more determined forces to a reduced model of a similar alternative second car body construction to achieve a third set of deformation values of the selected car body elements for the reduced model of the second car body construction, and
    determining if the third set of deformation values are within a predetermined deformation value range for meeting deformation demands of the second car body construction.

2. A method according to claim 1, wherein the first set of deformation values of the selected car body elements from the fully trimmed model of the first car body construction, are obtained from simulations in the complete dynamic load simulation model, or from sensors arranged on the fully trimmed model.

3. A method according to claim 1, wherein when the third set of deformation values are not within the predetermined desired deformation value range,
    changing one or more constructional parameters of the reduced model of the second car body construction to achieve one or more modified second car body constructions in the reduced model, and
    repeating the equivalent static load optimization simulation step for the modified second car body constructions in the reduced model until a new third set of deformation values are achieved within the predetermined desired deformation value range.

4. A method according to claim 1, wherein the method further comprises the step:
    verifying through simulating a fully trimmed model of the second car body construction or a fully trimmed model of the modified second car body constructions in the complete dynamic load simulation model during a specified time period, that the third set of deformation values of the selected car body elements of the fully trimmed model of the second car body construction or the fully trimmed model of the modified second car body constructions are within a predetermined deformation value range for the same car body elements.

5. A method according to claim 1, wherein the sets of deformation values of the selected car body elements are calculated as an absolute change in deformation or a relative change in deformation of a distance between two selected measuring points on the selected car body elements.

6. A method according to claim 1, wherein the first set of deformation values are established through a filtered deformation value calculation for each selected car body element.

7. A method according to claim 6, wherein filtered deformation values for the selected car body elements are established through collecting the simulated first set of deformation values of each selected car body element during the specified time period.

8. A method according to claim 7, wherein the filtered deformation values for each selected car body element are calculated as the mean value of a percentage of the simulated highest deformation values during the specified time period.

9. A method according to claim 1, wherein a possibility of calculating an equivalent static load in the equivalent static load simulation model is assessed through calculating a Max Principal Response Vector and a Vector Participation from the deformation values forming the first set of deformation values.

10. A method according to claim 1, wherein the one or more selected car body elements are one or more car body closure openings.

11. A method according to claim 10, wherein the one or more car body closure openings are one or more of a front door closure opening, a rear door closure opening, a roof closure opening, and a rear closure opening.

12. A method according to claim 10, wherein the set of deformation values are determined through calculations of deformations of diagonals of each of the selected car body closure openings.

13. A method according to claim 1, wherein the one or more selected car body elements are one or more cross sections.

14. A method according to claim 13, wherein the set of deformation values are determined through calculations of deformations of diagonals of each of the selected cross sections.

15. A method according to claim 1, wherein the reduced model of the car body constructions is a body-in-grey car body.

16. A method according to claim 1, wherein the one or more forces that need to be applied in the reduced model of the second car body constructions in the equivalent static load simulation model are applied to one or more strut mounting points of the reduced model of the second car body construction.

17. A non-transitory computer-readable medium storing executable instructions that, when executed by a computer, cause the computer to carry out the method of claim 1.

18. A cloud computing system configured to carry out the method of claim 1.

* * * * *